(12) United States Patent
Craft et al.

(10) Patent No.: US 11,138,374 B1
(45) Date of Patent: Oct. 5, 2021

(54) SLOT TYPE AUTHORING

(71) Applicant: Amazon Technologies, Inc., Seattle, WA (US)

(72) Inventors: Kevin Michael Craft, Seattle, WA (US); Kalpesh N. Sutaria, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/184,781

(22) Filed: Nov. 8, 2018

(51) Int. Cl.
*G06F 40/284* (2020.01)
*G10L 15/06* (2013.01)
*G06N 20/00* (2019.01)
*G06F 9/448* (2018.01)
*G10L 15/19* (2013.01)
*G10L 15/22* (2006.01)

(52) U.S. Cl.
CPC .......... *G06F 40/284* (2020.01); *G06F 9/4498* (2018.02); *G06N 20/00* (2019.01); *G10L 15/063* (2013.01); *G10L 15/19* (2013.01); *G10L 15/22* (2013.01)

(58) Field of Classification Search
None
See application file for complete search history.

(56) References Cited

U.S. PATENT DOCUMENTS

| | | | |
|---|---|---|---|
| 2003/0233223 A1 | 12/2003 | Wang | |
| 2004/0199374 A1* | 10/2004 | Wang | G10L 15/18 704/4 |
| 2004/0220809 A1* | 11/2004 | Wang | G06F 40/216 704/257 |
| 2008/0140389 A1* | 6/2008 | Funakoshi | G06F 40/30 704/9 |
| 2010/0299136 A1* | 11/2010 | Tong | G10L 15/22 704/9 |
| 2016/0188573 A1 | 6/2016 | Tang | |
| 2017/0212884 A1* | 7/2017 | Kim | G06F 40/35 |
| 2017/0235465 A1 | 8/2017 | Marin et al. | |
| 2018/0061401 A1 | 3/2018 | Sarikaya et al. | |
| 2018/0233141 A1* | 8/2018 | Solomon | G01S 5/28 |

(Continued)

OTHER PUBLICATIONS

Non-Final Office Action for U.S. Appl. No. 16/184,807, dated May 18, 2020, 15 pages.

(Continued)

*Primary Examiner* — Douglas Godbold
(74) *Attorney, Agent, or Firm* — NDWE, LLP

(57) ABSTRACT

Techniques for building slot types and slot type artifacts are described. For example, in some implementations, a natural language understanding (NLU) service is implemented by instructions that upon execution are to cause: receiving a request to build a slot type, the request including an indication of one or more locations storing information need to build a slot type, a slot type being a list of one or more values used to train a machine learning model to recognize a value for a slot; retrieving a slot type definition bundle associated with the request, the slot type definition bundle at least including a slot type definition defining resolution activities for the slot type; building the slot type using the retrieved slot type definition bundle; and storing into the storage slot type artifacts produced from building the slot type to be used during an analysis of an utterance.

20 Claims, 35 Drawing Sheets

(56) References Cited

U.S. PATENT DOCUMENTS

| | | | |
|---|---|---|---|
| 2018/0233143 A1* | 8/2018 | Papangelis | G06F 40/20 |
| 2018/0330721 A1 | 11/2018 | Thomson et al. | |
| 2019/0013017 A1* | 1/2019 | Kang | G06N 99/005 |
| 2019/0096394 A1* | 3/2019 | Ramachandra Iyer | G10L 15/1815 |
| 2019/0103101 A1* | 4/2019 | Danila | G10L 15/22 |
| 2019/0122181 A1* | 4/2019 | Maeda | G06Q 10/1095 |
| 2020/0104653 A1* | 4/2020 | Solomon | G06N 5/025 |

OTHER PUBLICATIONS

Non-Final Office Action for U.S. Appl. No. 16/184,793, dated May 18, 2020, 15 pages.
Final Office Action for U.S. Appl. No. 16/184,807, dated Dec. 15, 2020, 14 pages.
Final Office Action for U.S. Appl. No. 16/184,793, dated Dec. 14, 2020, 15 pages.

* cited by examiner

```
"interpretations" : [
  {
    "intents" : [
      {
        "BookHotel": {
          "slots": {
            "dates": {
              "labels": [
                {
                  "label": "startDate/month",
                  "value": "jan"
                },
                {
                  "label": "startDate/day",
                  "value": "1st"
                },
                {
                  "label": "startDate/day",
                  "value": "5th"
                }
              ]
            }
          }
        }
      }
    ]
  }
]
```

FIG. 10

```
# MATCH THE UTTERANCE "HELLO, MY NAME IS KEVIN"
MY_NAME_IS = "HELLO" "," "MY" "NAME" "IS" "KEVIN";

# MATCH UTTERANCES LIKE "FIVE OH SEVEN"
SPOKEN_DIGIT = "ZERO" | "OH" | "ONE" | "TWO" | "THREE" | "FOUR" | "FIVE" |
"SIX" | "SEVEN" | "EIGHT" | "NINE";
SPOKEN_FORM_NUMBER = SPOKEN_DIGIT+;

# MATCH UTTERANCES LIKE "MARCH THREE" AND LABEL "MARCH" AS A MONTH AND "THREE" AS A DAY
MONTH_NAME = "JANUARY" | "FEBRUARY" | "MARCH" | ... TRUNCATED ... ;
MONTH_DAY = MONTH_NAME AS PROPERTY:MONTH SPOKEN_FORM_NUMBER AS PROPERTY:DAY;

# MATCH UTTERANCES LIKE "MARCH 5TH" BY REFERENCING THE NLU.MONTH AND NLU.DAYOFMONTH SLOT
TYPES
MONTH_DAY = NLU.MONTH NLU.DAYOFMONTH;

# MATCH WRITTEN FORM NUMBERS LIKE "5,000" USING SUB-TOKEN RULES
TOKEN DIGIT = [0-9];
WRITTEN_FORM_NUMBER = DIGIT{1,3} ("," DIGIT{3})*;

# EXPORT A RULE
EXPORT MY_EXPORTED_RULE = "HELLO" "WORLD";

# EXPORT A DEFAULT RULE
EXPORT DEFAULT MY_DEFAULT_EXPORTED_RULE = "HELLO" "WORLD";

# EXPORT A SPOKEN FORM RULE
EXPORT MY_SPOKEN_FORM_RULE = {
EXPRESSION: "HELLO" "WORLD",
SPOKENFORM: TRUE
};

# ATTACH SOME RESOLVERS TO A RULE (RESOLVERS WILL BE EXPLAINED LATER)
MY_RESOLVED_RULE = {
EXPRESSION: "HELLO" "WORLD",
RESOLVERS: [
RESOLVERONE,
RESOLVERTWO
]
};
```

*FIG. 18*

SLOT TYPE AUTHORING

BACKGROUND

Services for building conversational interfaces into any application using voice and text may utilize advanced deep learning functionalities of automatic speech recognition (ASR) for converting speech to text, and natural language understanding (NLU) to recognize the intent of the text, to enable building applications with highly engaging user experiences and lifelike conversational interactions.

Speech recognition and natural language understanding are some of the most challenging problems to solve in computer science, requiring sophisticated deep learning algorithms to be trained on massive amounts of data and infrastructure.

BRIEF DESCRIPTION OF DRAWINGS

Various embodiments in accordance with the present disclosure will be described with reference to the drawings, in which:

FIG. 10 illustrates example embodiments labels.

FIG. 18 illustrates examples of embodiments of rules of a grammar DSL.

DETAILED DESCRIPTION

Various embodiments of methods, apparatus, systems, and non-transitory computer-readable storage media for natural language understanding (NLU) are described. In particular, embodiments directed to auto-scaling, distributed, multi-tenant hosting of machine learning models for NLU are detailed.

NLU models can be on the order of tens of megabytes (10-20 MB), hundreds of megabytes (such as 300-500 MB), etc. in size. In systems that have a large number of models or bots that may be used, hosting each model is unlikely to be efficient. For example, in some systems out of a total of 120,000 bots, only 2,000 receive traffic on any given day. Hosting the remaining 118,000 bots simply is not likely to be an efficient use of resources that could be used by other tenants.

Figure 1:
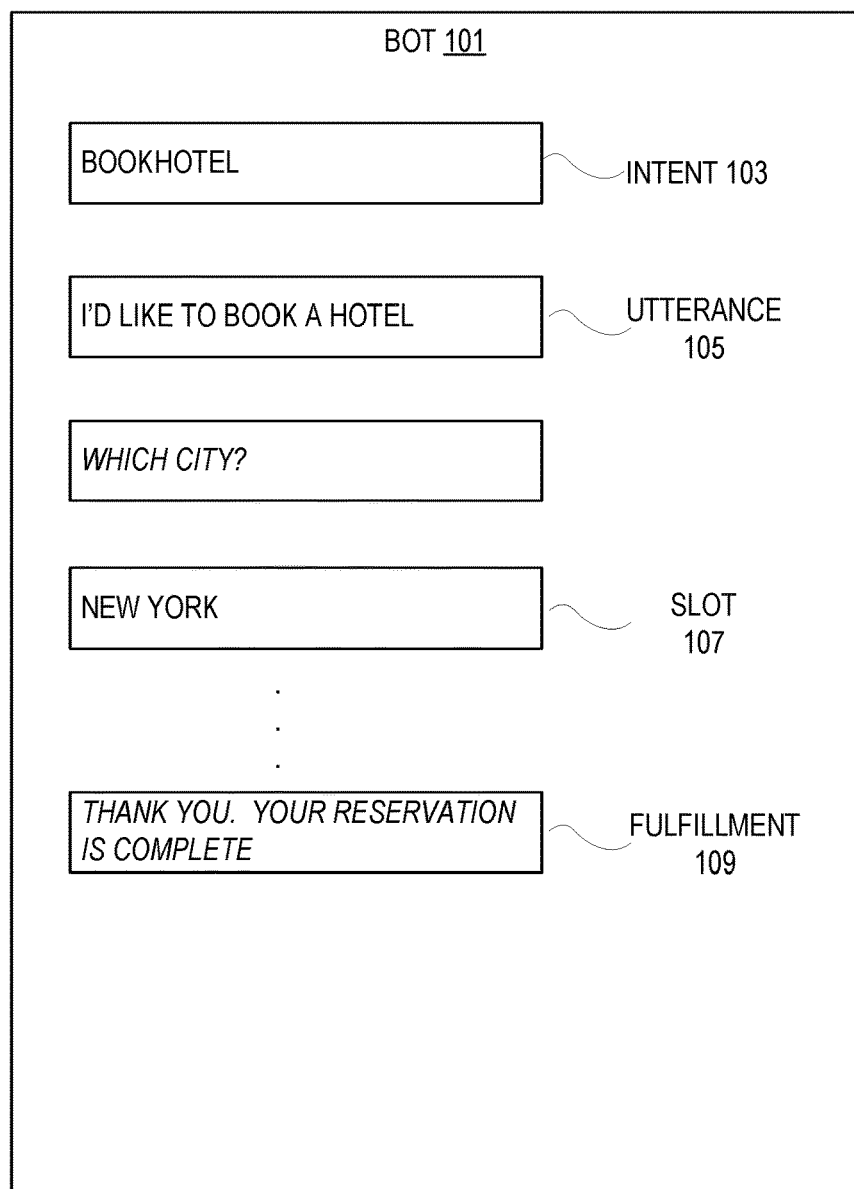
FIG. 1 illustrates an example embodiment of a bot usage.

FIG. 1 illustrates an embodiment of a bot usage. In this example, the bot 101 is used to intake user input (such as utterances) and provide responses to the input (shown in italics). In this example, the intent 103 of the bot 101 is to book a hotel. An intent represents an action to take in response to natural language input.

A user provides an utterance 105 in the form of spoken or typed phrase that invokes the intent 103. Slots 107 are input data required to fulfill the intent. Each slot has a type. A slot type is a list of values used to train a machine learning model to recognize values for a slot (e.g., "New York" in this example).

Finally, the bot 101 provides an indication of fulfillment. Detailed herein are embodiments directed to performing NLU of utterances such as "I'd like to book a hotel" and "New York" in this example.

Detailed below are examples of embodiments of systems, apparatuses, and methods for extracting slots from natural language utterances. For example, if a user says, "I want to book a hotel next Friday for 5 nights," then "next Friday" should be recognized as a first slot, "checkInDate" as a second slot, and "5" as a "numberOfNights" slot. Further, each slot has a corresponding type that defines what kind of data should recognized. For example, a "checkInDate" slot may be of the type "NLU.Date," and the "numberOfNights" slot may be of the type "NLU.Number." In some embodiments, "composite" slot types have multiple properties. For example, a NLU.Date can have a month, a day, and a year.

Once a slot value has been determined within an utterance, that slot value is to be turned into something that is machine-readable. For example, "next Friday" could be transformed into "month": "7", "day": 6", "year": "2018", which is an object that represents a particular "next Friday." Turning slot values into machine-readable data may be complicated for composite slot types because these slot types can have properties that are also composite slot types. An exemplary slot type has properties of "month" which is a NLU.Month, "day" which is a NLU.DayOfMonth, and "year" which is a NLU.Year. These slot types can, in turn, reference other slot types. For example, NLU.DayOfMonth might use NLU.Number. As such, as will be detailed below, in some embodiments, a graph or tree structure is formed and used to resolve a value.

For example, to resolve a value like "jan twenty first 2018," the individual parts of this slot value are labeled. For example, "jan" is labeled as "NLU.Date/month/NLU.Month/name", "twenty first" is labeled as "NLU.Date/day/NLU.DayOfMonth/NLU.Ordinal/spoken_form", and "2018" is labeled as "NLU.Date/year/NLU.Year/NLU.Number/written form." These labels are combined to form a graph or tree. The value "jan twenty first 2018" is then resolved to "month": "1", "day": "21", "year": "2018" by starting at the leaf nodes of the graph or tree and traversing up to the root node, and, at each node, performing part of the resolution. For example, one node in the graph or tree might convert "jan" to "1." Another might convert "twenty first" to "21." These resolution steps are defined during slot type authoring as will also be detailed.

The use of composite slots and graph or trees in resolving such slots allows for a high level of expressiveness and re-usability in NLU slot types. For example, many slot types can re-use the functionality of NLU.Number without having to rewrite the logic to transform spoken form numbers (such as "twenty-first") into written form numbers (such as "21").

Figure 2:
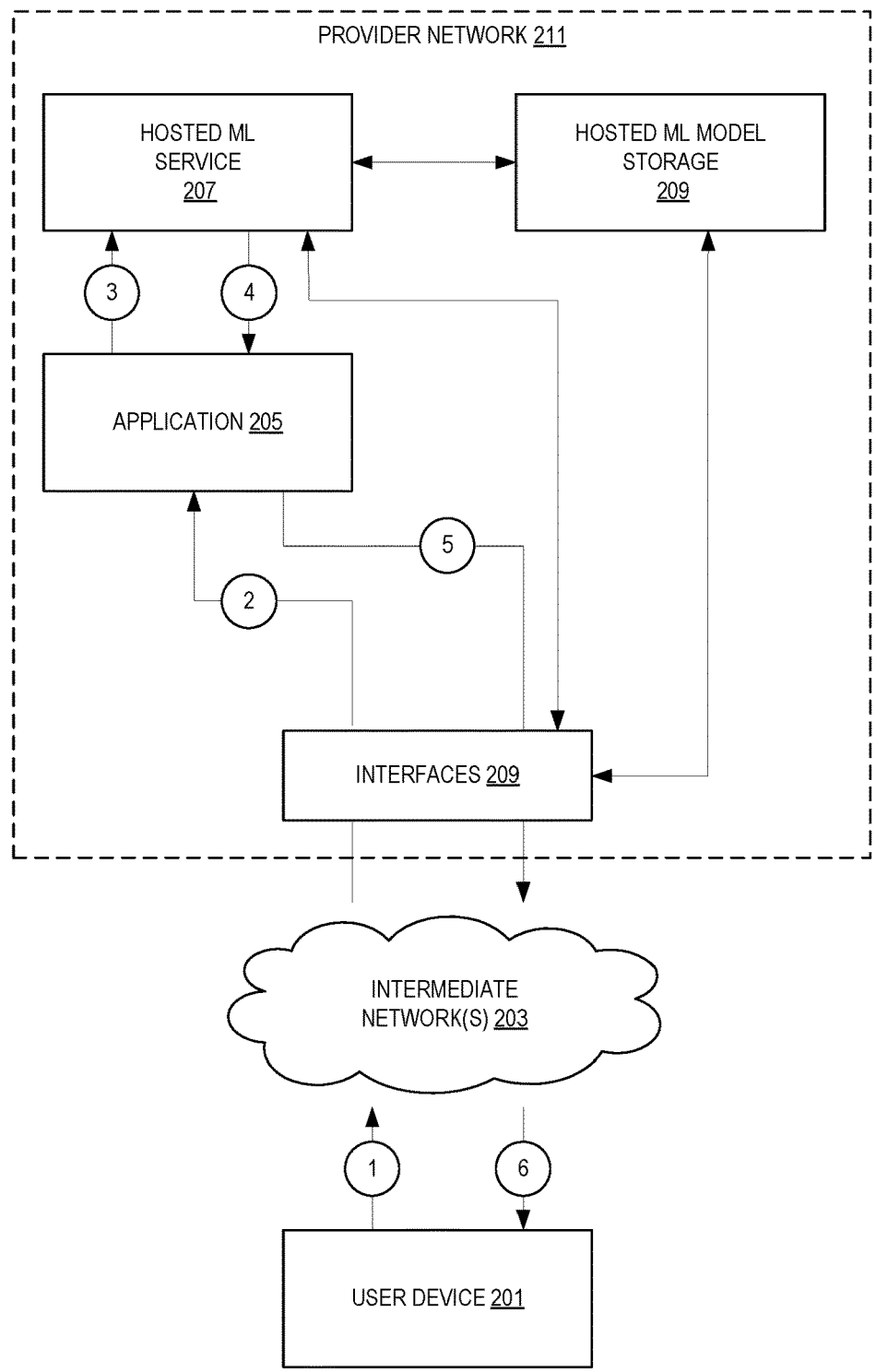
FIG. 2 illustrates example embodiments of a system for performing NLU operations including inference.

FIG. 2 illustrates embodiments of a system for performing NLU operations including inference. As shown, a provider network 211 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. for at least NLU. These and other computing resources may be provided as services, such as a hardware virtualization service that can execute compute instances, a storage service that can store data objects, etc. The users (or "customers") of provider networks 211 may utilize one or more user accounts that are associated with a customer account, though these terms may be used somewhat interchangeably depending upon the context of use. Users devices 201 may interact with a provider network 211 across one or more intermediate networks 203 (e.g., the internet) via one or more interface(s) 209, such as through use of application programming interface (API) calls, via a console implemented as a website or application, etc. The interface(s) 209 may be part of, or serve as a front-end to, a control plane of the provider network 211 that includes "backend" services supporting and enabling the services that may be more directly offered to customers.

To provide these and other computing resource services, provider networks 211 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

In this illustration, the provider network 211 provides NLU services including, but not limited to, inference for utterances in support of an application 205. As shown, at circles 1 and 2, a user device communicates with the provider network 211 via intermediate networks 203 and interfaces 209. In particular, the user device communicates with an application 205 (such as a bot) that is going to utilize the hosted ML service 207. Note that this is exemplary, and this application 205 is not utilized in all instances. An example of a communication is an "utterance" and this example will be used throughout the remainder of this description.

The application 205 takes the utterance and makes a request to the hosted ML service 207 at circle 3. The hosted ML service 207 hosts machine learning (ML) models for different entities on a shared fleet of physical and/or virtual hosts. The compute capacity used for the ML models may be scaled with the throughputs of bots and allows the fleet to scale with the total memory consumption of the ML models. The hosted ML models may be custom (customer provided) or provided by the service. The hosted ML service 207 includes, in this example, an inference component performs an inference operation on the utterance using a ML model it acquired from hosted ML model storage 209.

The results of the operation are returned to the application 205 at circle 4 and then forwarded back to the user device as needed in circles 5 and 6.

Figure 3:
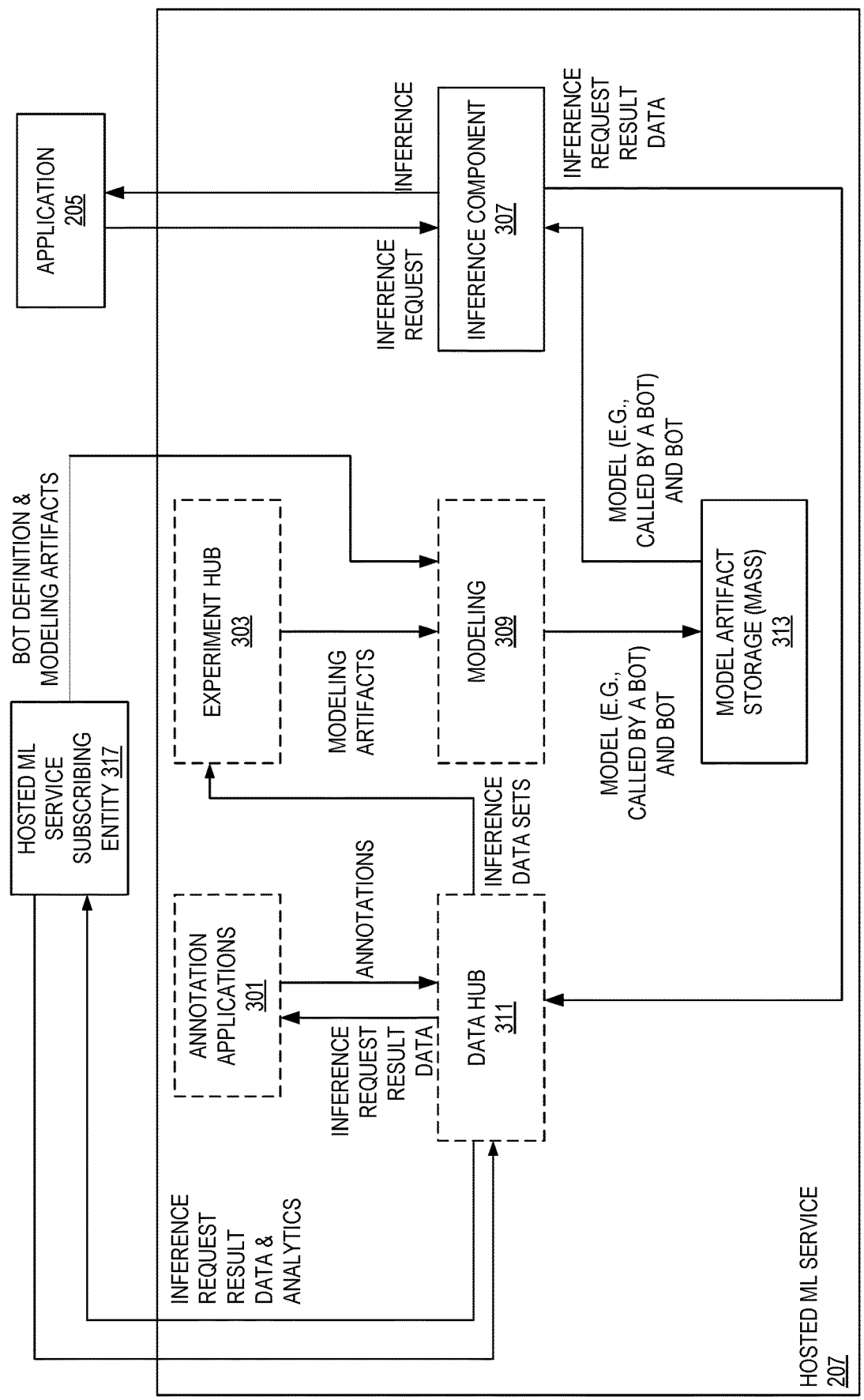
FIG. 3 illustrates example embodiments of a system for handling NLU inferences in a provider network along with an application and a NLU service subscribing entity.

FIG. 3 illustrates embodiments of a system for handling inferences in a provider network along with an application and a hosted ML service subscribing entity. In particular, embodiments of a hosted ML service 207 that performs NLU are shown.

A service subscribing entity 317 provides bot definitions and/or modeling artifacts (ML models) to the hosted ML service 207. An application 205 interfaces with the provided bot(s) and/or modeling artifacts (model, training data, etc.).

An inference service component 307 serves inference requests to extract information (such as domain, intent, and/or slot labels) from utterances provided by the application 205 (such as via a bot) and structure the extracted information in a developer-consumable way (such as slot resolution). The inference service component 307 performs one or more of preprocessing text, load necessary artifacts, invoking algorithms for machine learning tasks such as intent classification and slot labeling, postprocessing the output, and/or dialog frame merging.

In some embodiments, the inference service component 307 uses consistent hashing routing to route inference requests to a particular inference service group (ISG) which includes at least one auto-scaling group of hosts. Inference service groups are discussed in more detail later. Further, in some embodiments, a load balancer of the inference component 307 uses target groups and listener rules with path-based routing to route the requests to the inference service group. Each ISG hosts a set of models and scales up based on the throughput of the models hosted in the ISG. Details of some embodiments of the inference component 307 are detailed in subsequent figures and corresponding discussion.

A model artifact storage (MASS) 313 is an available and scalable data store that persists model artifacts to be used by the inference component 307. In some embodiments, the MASS 313 is optimized for read access (serves most of the read traffic from cache). In some embodiments, ML model storage 209 at least includes the MASS 313.

In some embodiments, the hosted ML service 207 includes a modeling component 309 which produces items to be used for inference. As such, the modeling component 309 serves requests to create and manage all modeling artifacts. Examples of items that are produced include, but are not limited to: a word embeddings model, built-in artifacts such as catalogs and grammars, and bots.

In some embodiments, a data hub 311 stores and serves data pertaining to utterances (such as inference request result data, analytics, inference data sets, etc.) to one or more entities such as a hosted ML service subscribing entity 317, annotation applications 301, and an experiment hub 303. Utterance data includes debugging information provided by the inference component 307. The data hub 311 allows for querying of utterances and annotation of utterances. The data hub 311 exports utterance data and/or analytics.

In some embodiments, the experiment hub 303 provides a secure environment with the tools to access utterance data (from the data hub 311) and perform experiments with them. Artifacts produced using the experiment hub 303 are published to the MASS 313 via the modeling component 309.

In some embodiments, the annotation applications 301 are a collection of tools used to annotate utterance data provided by the data hub 311.

Figure 4:
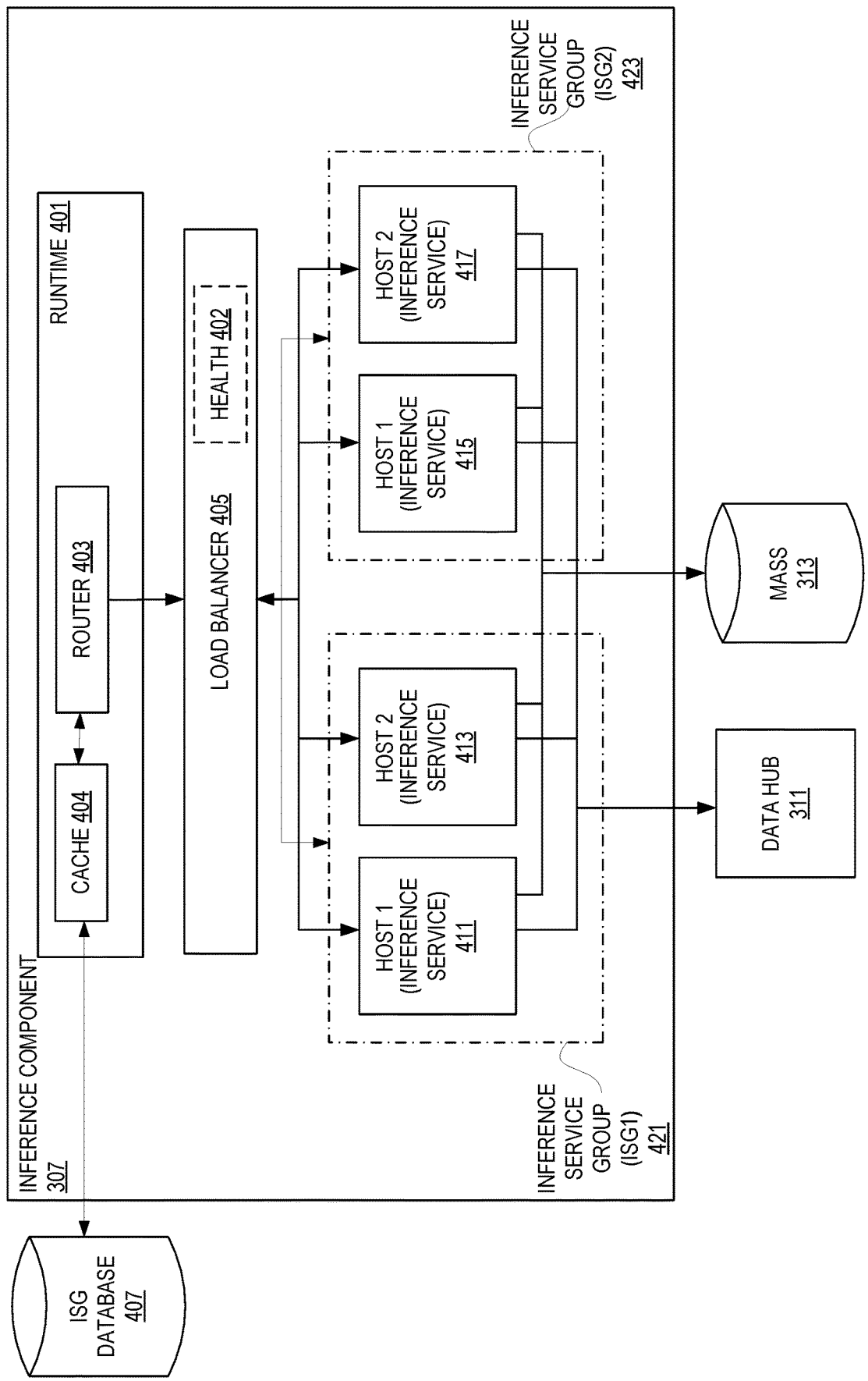
FIG. 4 illustrates example embodiments of an inference component.

FIG. 4 illustrates embodiments of an inference component such as inference component 307. An inference component comprises one or more autoscaling inference service hosts 411-417 that are a part of one or more ISGs 421 and 423. As shown, each ISG 421 and 423 is a collection of inference service hosts that serve the same set of models. An ISG 421 or 423 is implemented using scaling groups for service hosts that can scale up or down based on the throughput of the models that are hosted in the ISG 421 or 423.

The inference service hosts 411-417 of the ISGs 421 or 423 host inference services that perform inference operations on received utterances and make the results of such inferences available. In some embodiments, an inference service is a collection of containerized micro-services that are hosted on the same host and work together to generate NLU interpretations with tasks like intent classification, slot labeling, multi-turn dialog support, context awareness, etc.

An ISG database 407 includes a list of inference worker hosts and/or their health status. In some embodiments, the ISG host database 407 also stores an indication of what models are loaded or in the overflow model cache. At service startup time, the ISG host database 407 is polled to retrieve the list and used to update the cache 404 with the appropriate models, etc. During execution, this ISG host database 407 is polled at some interval for the list to help determine how to load additional hosts, add new ISGs, etc.

As noted above, the NLU router 403 receives utterances from a NLU client to be processed. The NLU router 403 uses a consistent hashing scheme to route utterances to an ISG via a load balancer 405. In some embodiments, the load balancer 402 includes a component to perform health checks on hosts, etc.

Figure 5:
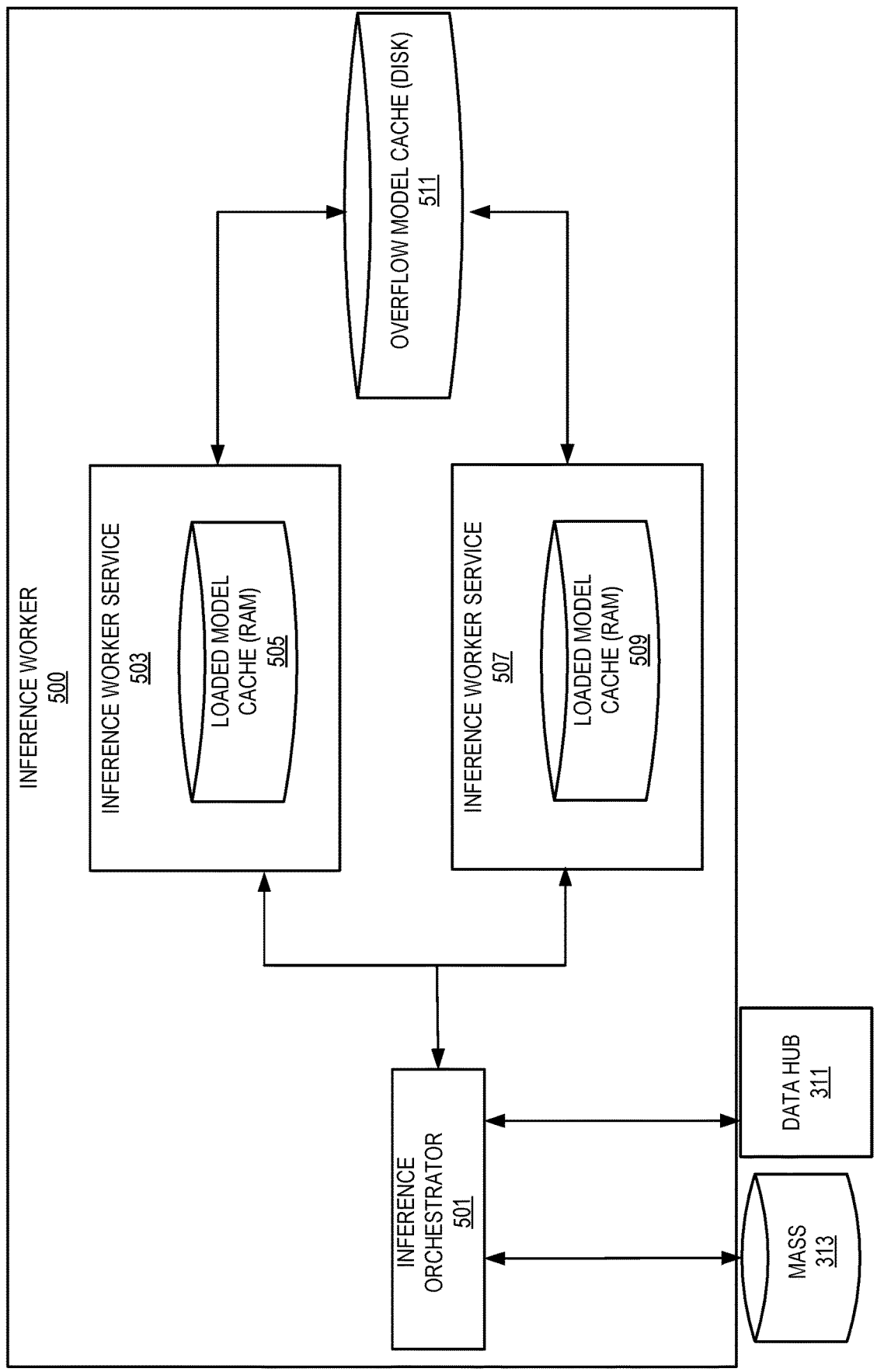
FIG. 5 illustrates example embodiments of an inference service on a single host.

FIG. 5 illustrates embodiments of an inference worker service on a single host. The entry point of the inference service is the inference orchestrator 501. The inference orchestrator 501 generates interpretations from text. In some embodiments, the inference orchestrator 501 comprises a plurality of software modules to perform artifact/bundle management, preprocessing, recognizing, resolving (slot resolution), context managing (e.g., dialog act support, context carryover), and connecting with the data hub 311 to provide results of an inference.

The inference orchestrator 501 couples to one or more inference worker services 503 and 507. Each inference worker service 503 or 507 performs an inference job using model-based inference that may include resolving a composite slot. Examples of such models include, but are not limited to: DiSAN (DNN), CRF (statistical), FST (deterministic), and/or solution. Note that the inference orchestrator service 501 and one or more inference worker services 503 and 507 are software components (e.g., containers) executing on hardware.

As noted above, it is not practical to have all known models loaded by any given inference worker service 503 or 507. Rather, a proper subset of models are loaded in a "model cache" 505 or 509 such as random access memory (RAM) on a physical host. A list of models that are present in memory is maintained in some embodiments.

Another "cache" is external to RAM such as a on disk in a physical host. This is an "overflow" model cache 511. This overflow cache 511 offers another means to potentially save a loading from the MASS of a model. Further, models are written to the overflow model cache 511 upon server shutdown and read from disk (such as MASS 313) and loaded in the loaded model caches 505 and 509 upon service startup.

When a model inference request comes in that there is not a corresponding model in either the loaded model caches 505 or 509, or the overflow model cache 511, a call is made to the MASS to fetch the model, the least frequently used model is evicted from the caches, and the fetched model is loaded for execution and used to generate an inference.

Figure 6:
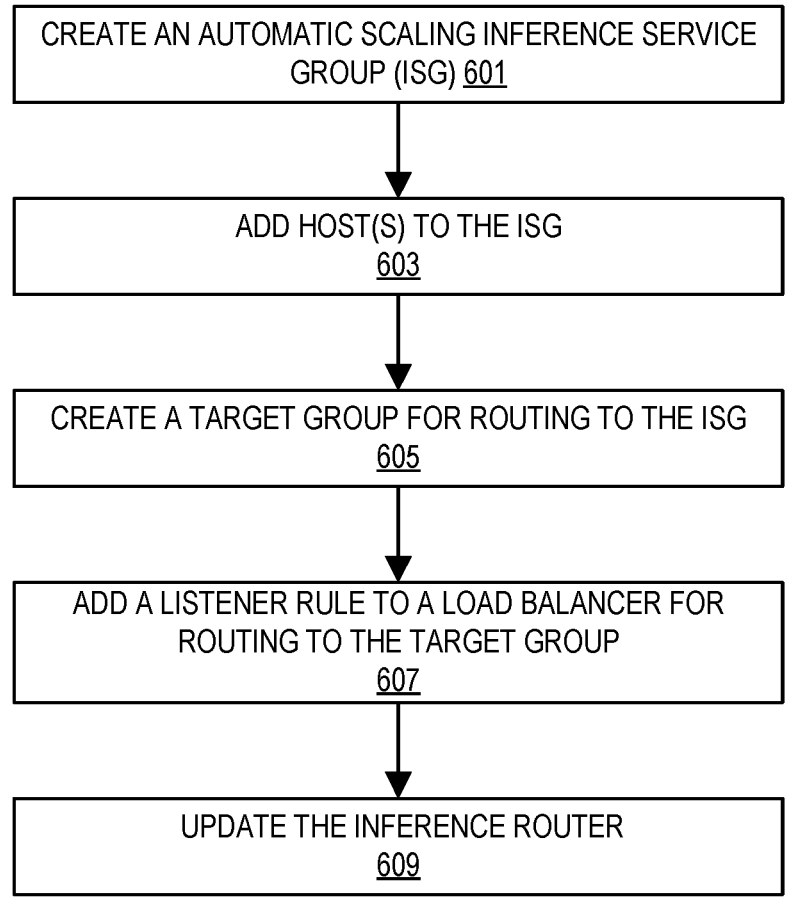
FIG. 6 illustrates example embodiments of a method for configuring an ISG.

FIG. 6 illustrates embodiments of a method for configuring an ISG. In some embodiments, aspects of the method are performed by the inference component 307. In some embodiments, aspects of the method are performed by a front end (such as interfaces 209).

At 601, an auto scaling group (ASG) for an ISG is created. For example, a user provides configuration information for an ASG for the ISG through a web interface of the provider network and the front end of the provider network then configures the ASG for the ISG.

Hosts are added to the created ASG at 603. For example, a user provides information as to which hosts are to be added to the ASG for the ISG through a web interface of the provider network and the front end of the provider network then configures the ASG to include one or more hosts for the ISG.

A target group is created for routing to the created ISG at 605. A target group is used to route requests to one or more registered targets based on listener rules. Listener rules define how the load balancer 405 is to route requests to the targets in one or more target groups. In some embodiments, each listener rule consists of a priority, action, optional host condition, and optional path condition. When a rule condition is met, traffic is forwarded to a corresponding target group.

One or more listener rules are placed into load balancer 405 for routing to the above target group with path-based routing at 607. For example, a listener rule like "/ISG1/*'→target-group1" will make requests like "inference-worker.awsamazon.com/ISG1/infer" route to ISG1.

Finally, the NLU router 403 is updated to start routing to the newly created inference service group at 609. In some implementations this updating is called discovery. In essence, the NLU router 403 needs to know about the list of inference service groups that it supports both to use consistent hash-based routing and to construct a URL for routing. In some embodiments, to update the list, an entry is manually entered into a whitelist configuration; however, it will not require a deployment to propagate the change.

Figure 7:
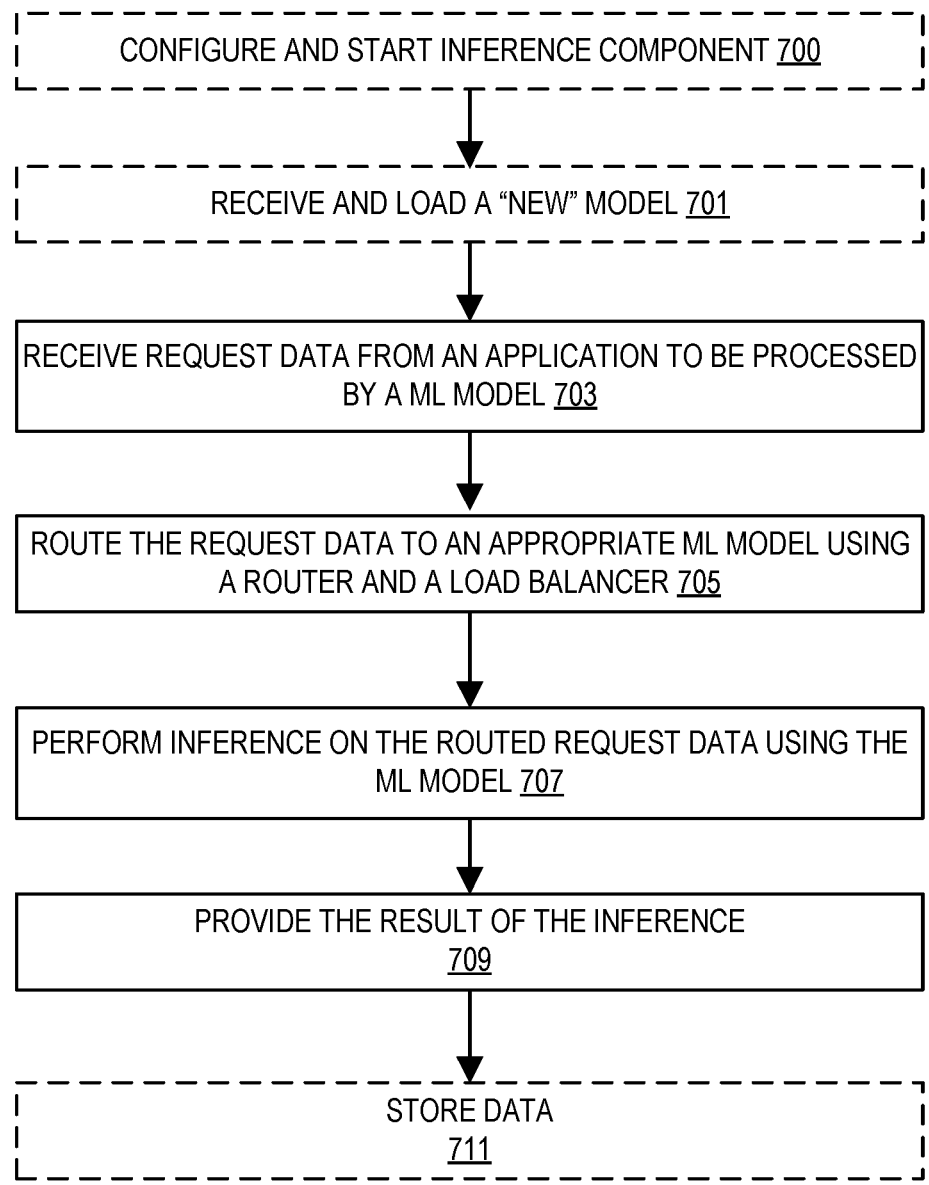
FIG. 7 illustrates example embodiments of a method of utilizing a NLU service for inferencing.

FIG. 7 illustrates embodiments of a method of utilizing a NLU service for inferencing. At 700, a NLU inference component 307 is configured and started in some embodiments. For example, one or more ISGs (and corresponding ASGs) are configured, models are loaded into hosts, etc. Examples of configuring ASGs are described with respect to FIG. 6. In some embodiments, models are loaded based on a least frequency used (LFU) caching strategy from either MASS 313 or disk 511. Models are loaded from disk 511 if available.

With an up and running inference component 307, in some embodiments, a "new" model is received and loaded at 701. In some embodiments, new models are loaded by submitting a "dummy" request to a host that does not include an utterance. The lack of anything to operate on causes the host to load the new model into its cache from the MASS 313. As such, when a "real" request comes in with an utterance, the new model will be loaded and ready to use. Note that, depending upon utilization, a new model may force a lesser used model to be flushed to disk or removed all together from the host.

At some point in time, a request (including data) to perform an inference for an utterance using a particular hosted ML model is received at 703. For example, an utterance provided by a user to a bot is received at the inference component 307 at the NLU router 403.

The request data (utterance) is routed to the appropriate ML model using a router and load balancer at 705. For example, load balancer 405 routes according to embodiments of the method of FIG. 8.

The appropriate ML model performs the inference on the routed request data at 707 and provides a result of the utterance inference at 709. For example, an FST is utilized and the result is provided back to a requesting bot.

In some embodiments, the result of the inference and/or request data is stored at 711 such as detailed earlier.

As noted above, in some embodiments, the inference component 307 supports a plurality of slot types including, but not limited to: scalars, composites, and unions. Detailed herein are embodiments of systems, apparatuses, and methods for resolving composite slot types in an inference component. For example, resolving a composite slot using an inference orchestrator and one or more worker services of an inference worker are detailed. A composite slot type is a slot type that has multiple properties. Further, composite slot types can be nested. For example, date property may be a composite slot type with three properties: month, day, and year. Thus, composite slot types can be represented as trees.

Figure 8:
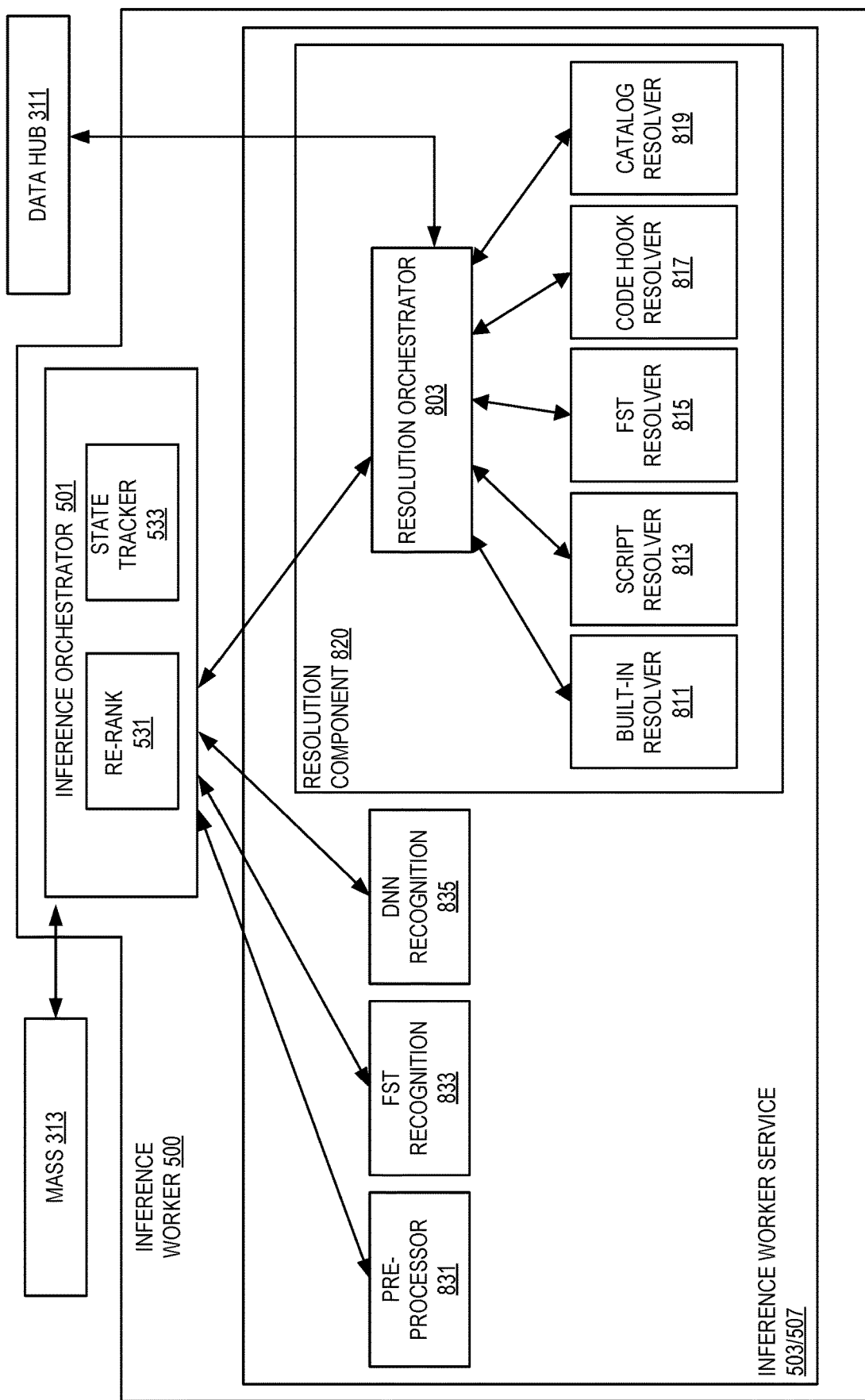
FIG. 8 illustrates examples of embodiments of an inference worker.

FIG. 8 illustrates examples of embodiments of an inference worker. As shown, inference worker 500 includes an inference orchestrator 501 and one or more inference worker services 503/507. These components have been detailed with respect to FIG. 5 above. In this illustration, more detailed descriptions of inference worker services 503/507 are embodied.

The inference orchestrator 501 receives an utterance from the load balancer 405 to perform an inference operation on and returns an "n" best list (that may be reranked using re-rank component 531 using the probability distribution of the intents and slots to generate tuples and then ranking across the tuples). In this illustration, to perform that inference (resolving the utterance) may utilize a resolution component 820 and at least one recognition component such as FST recognition 833 and DNN recognition 835. In some embodiments, the inference orchestrator 501 includes a state tracker 533. The state tracker 533 operates before resolution to look at a conversion to identify labels that belong to the same slot across different turns and merges them before sending to the resolution orchestrator 803.

The recognition components 833 and/or 835 identify slot values in a natural language utterance labels as a list of interpretations that have been identified. As such, the list of interpretations is a list of intents as slot labels, and, in some embodiments, confidence bins/scores for each slot label. A label is applied by a recognizer 833 and/or 835 to a substring of an utterance. For example, a label identifies that substring as part of a slot value. For example, "cheese" might be labeled as a "topping" in the utterance "I want to order a cheese pizza." A pre-processor 831 may be utilized to clean-up the utterance, tokenize the utterance, and/or perform automatic speech recognition (ASR) on verbal utterances prior to recognition by the FST recognition component 833 and/or the DNN recognition component 835.

In some embodiments, labels are applied at any granularity. This is useful for composite slot types. For example, the individual month, day, and year parts of a NLU.Date slot type can be labeled separately. This enables for a generalization by a ML model on the rest of the utterance, which means that small changes to carrier phrases or word morphologies should not impact labeling performance. For example, a grammar author defines a grammar defining the behavior for slot types. For example, a grammar may define a pattern from January 1st to the 2nd, and the ML model (such as resolvers 811-819) might learn that the pattern between January 1st and the 2nd is equivalent. In this case, the ML model would still label the individual date parts and the pattern may be resolved even though it is not explicitly defined in the grammar. A grammar also defines labels that differentiate between the forms that a value can take. For example, a number can be represented in both written form ("15") and spoken form ("fifteen"). A grammar can apply different labels to these forms, which allows for application of different resolution logic to them. Grammar authors can reference slot types within their grammar to re-use their functionality in some embodiments. For example, if a slot has a property called "year", which is a number, instead of rewriting the grammar rules to match a number, the author can reference only a slot type. Properties are attributes of a slot type. Patterns (rules) allow grammar authors to differentiate between different patterns of text that should be resolved differently. Rules may also be referenced. Grammar authors can attach resolution logic to any rule within their grammar. This causes the rule to be included in the recognition graph as a pattern. A more thorough discussion of grammar, recognition tree generation, and potential optimizations of a recognition tree are detailed later.

Figure 9:
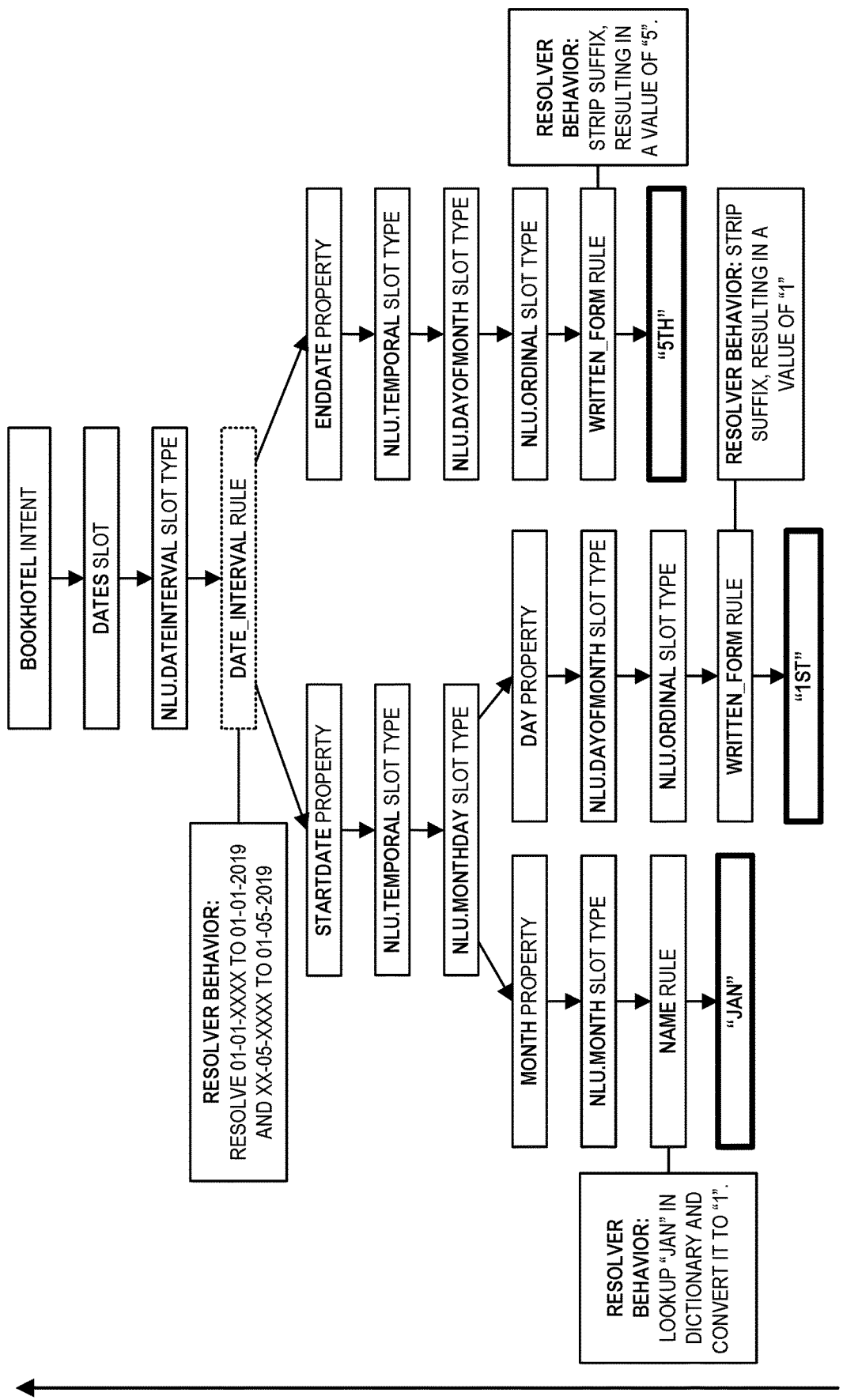
FIG. 9 illustrates an example of a recognition graph.

In some embodiments, the label generated by the recognition components 833 and/or 835 is a label path. A label path gives us the full path from a root (slot) to a leaf (ordinal) of a graph or tree of labels, which allows for applying the proper resolution logic from the leaf to the root. FIG. 9 illustrates an example of an output of a recognition component. In this example, there are three label paths ("label") that comprise a plurality of slot types (in other words, composite slot types).

A resolution component 820 takes in the label paths and slot type configurations, generates a tree, and resolves the slot values into machine-readable values. Note that each slot type in the tree may have its own resolution logic. For example, a NLU.DayOfWeek slot type might be represented as a string ("Monday") or an ordinal ("1st day of the week"). For the ordinal case, the NLU.Ordinal slot type may be reused within the NLU.DayOfWeek grammar. At resolution time, NLU.Ordinal would resolve "1st" to "1", and NLU.DayOfWeek would resolve "1" to "Monday."

The properties that are labeled by recognition are not necessarily the same as the properties that will be returned by resolution. In fact, recognition can be represented as a graph, whereas resolution can be represented as a tree. Relative dates are a good example of why they are different. Consider the following utterance: "book a hotel 2 days from now." The portion "2 days from now" likely should be resolved to an absolute date such as {"month": "7", "day": "27", "year": "2018" }, but nothing in this utterance corresponds to a month, day, or year. Instead, the following labels are produced: {"amount": "2", "unit": "days", "referencePoint": "now"}. These labels are then used to resolve to an absolute date: {"month": "7", "day": "27", "year": "2018"}.

Recognition graphs and resolution trees have the following differences: the recognition graph is a Directed Acyclical Graph (DAG) and the resolution tree is a tree; the recognition graph is usually larger and contains more properties than the resolution tree; the resolution tree represents an entity, whereas the recognition graph is more like a parse tree because it represents a set of patterns that can be matched by a grammar; the recognition graph is defined by a grammar author; the recognition graph can contain other types of nodes, such as patterns (rules) which the resolution tree does not contain; and the recognition graph can export multiple start nodes and end with multiple terminal nodes.

Slot type configurations may include one or more of: global configurations (e.g., configure slot type behavior globally), slot configurations to configure behavior for a specific slot, and slot type configurations to configure behavior for dependency slot types.

A resolver orchestrator 803 of the resolution component 820 takes in the list of labelled values that were identified in the natural language utterance by the recognizers 833 and/or 835 and slot type configurations (provided, for example, by a bot developer), and resolves them into machine-readable values by calling one or more resolvers 811-819. The resolver orchestrator 803 performs the generation of and combining of label paths into a graph or tree and resolves nodes starting from the leaf nodes and moving up the graph or tree toward the root. In some embodiments, the resolution orchestrator 803 returns an "n" best list.

For example, for the utterance of "Book a hotel from January 1st to the 5th", the recognizers 833 and/or 835 would produce the labels shown in FIG. 10 based upon a recognition graph of FIG. 9.

FIG. 9 illustrates an example of a recognition graph. As noted earlier, there are three non-intent types of nodes in a recognition graph: slot types, properties, and rules (patterns). Patterns may be further broken down into exported rules and rules with resolvers.

A recognition graph can also have multiple start nodes (the only start node is in a dashed box) and end with multiple terminal nodes (shown with thicker borders). These nodes are the start and end points of the grammar used to make the recognition graph.

A label in the recognition graph is a path from a start node to a terminal node. Examples of some of the labels from this graph are:
[
  {
    "value": "jan",
    "label": "slot-type:name=LEX.Date,version=1/pattern:
      name=date/property:name=month/pattern:
      name=name"
  },
  {
    "value": "1st",
    "label": "slot-type:name=LEX. Date, version=1/pattern:
      name=date/property:name=day/pattern:name=ordinal/
      slot-ype:name=LEX.Ordinal,version=1/pattern:
      name=written_form"
  }
]

In some embodiments, recognition graphs are label path optimized such that the amount of labels and/or content of the labels is reduced by removing unnecessary nodes and merging sibling nodes with the same name.

Superfluous information may include slot-type, properties, and patterns. For example, the path of "slot-type: name=NLU.Date,version=1/pattern:name=date/property: name=day/slot-type:name=NLU. Ordinal,version=1/ pattern:name=written_form" can be simplified to "NLU.Date/date/day/NLU.Ordinal/written_form"

Figure 11:
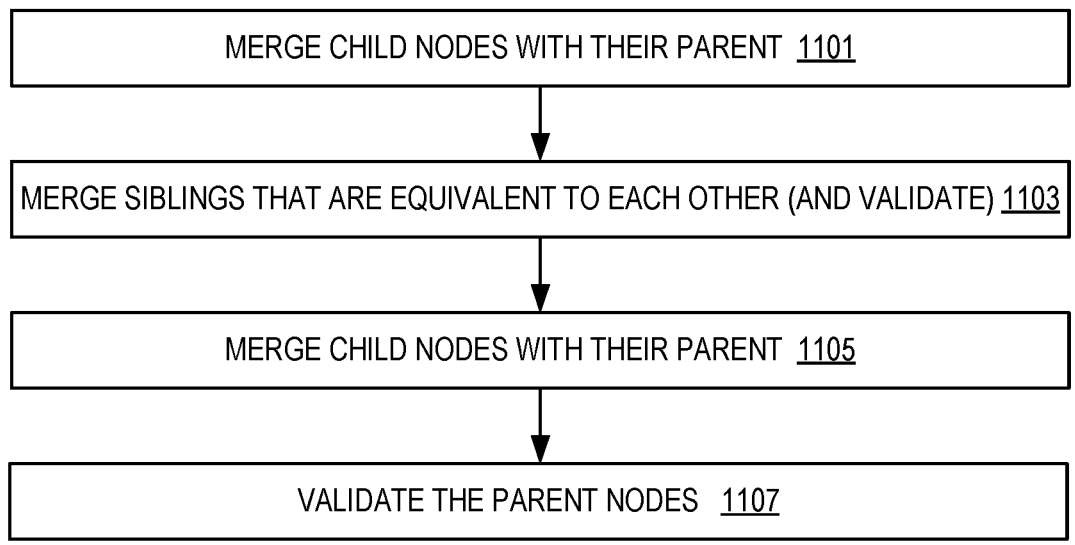
FIG. 11 illustrates an example of embodiments of a method of label path optimization.

FIG. 11 illustrates an example of embodiments of a method of label path optimization. In some embodiments, this is performed by the resolver orchestrator 803. In other embodiments, the recognizers perform this function.

At 1101, child nodes are merged with their parent. Children may be merged when they are not critical or the parent node is a part of more paths than the child node. Merging a child node with the parent means moving the child node's operators to the parent node, moving the resolvers from the child node to the parent node, and removing the child node since it is no longer needed to uniquely identify a label path.

Siblings that are equivalent are merged and validated at 1103 by grouping equivalent nodes together and merging into a single node (removing the now "extra" nodes). Siblings are equivalent when they result in the same path.

After the sibling merger, child nodes are merged with their parent for a second time at 1105.

Finally, a determination of if the parent(s) is/are valid is made at 1107.

The resolver orchestrator 803 combines labels output from the recognizers into a recognition tree structure and then evaluates each token from the leaf to the root. The resolver orchestrator 803 outputs a list of interpretations (an "n" best list) based upon those resolutions. Each interpretation includes a list of intents that were identified with each intent including a list of slot values that were resolved for that intent. Each resolved slot value includes the slot type, value, and/or confidence bin/score.

Figure 12:
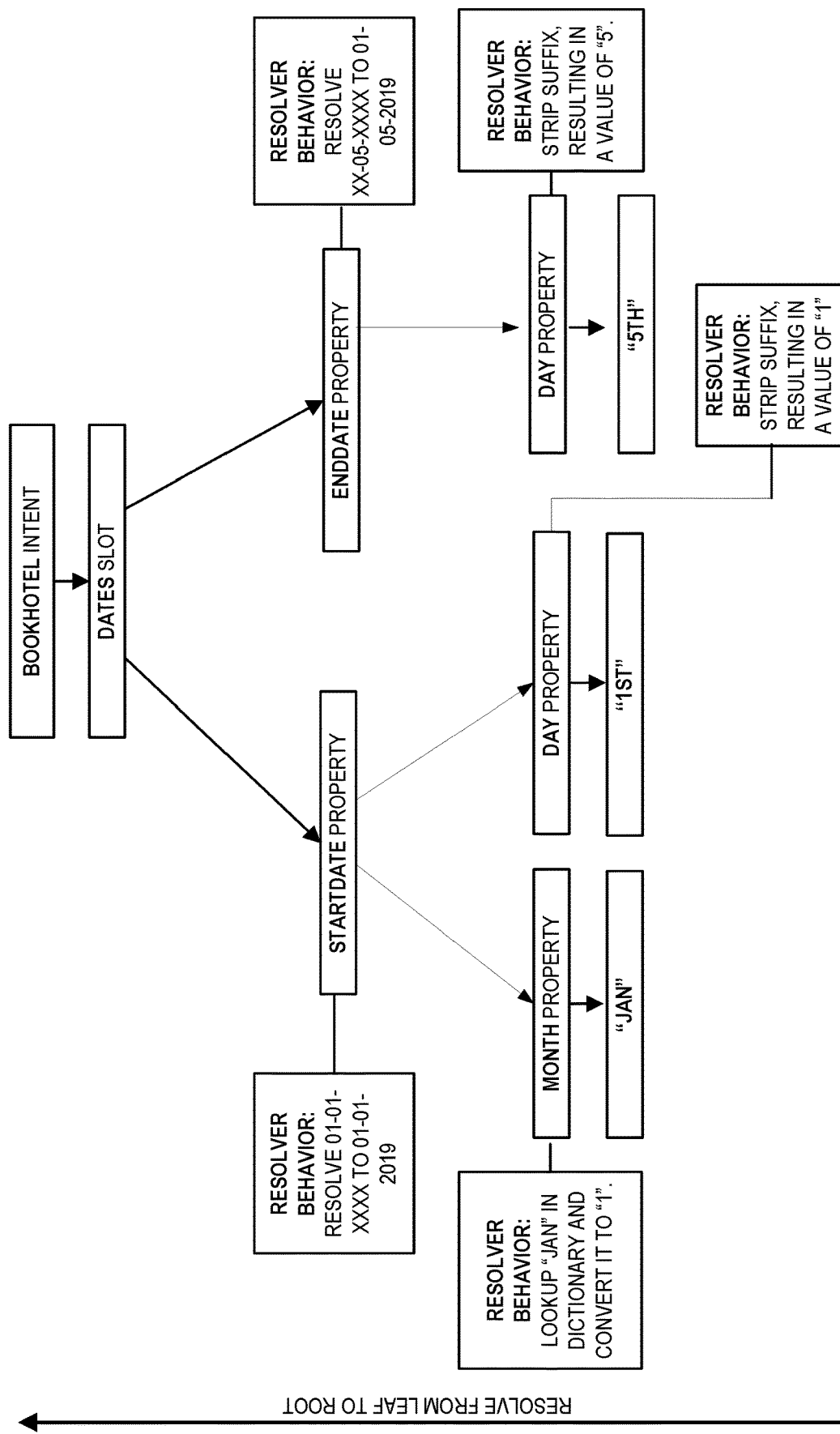
FIG. 12 illustrates an example of a recognition tree generated by combining the labels shown in FIG. 10.

FIG. 12 illustrates an example of a recognition tree generated by combining the labels shown in FIG. 10. Note that the recognition tree is simpler than the recognition graph. In some embodiments, there are no rules or slot-types. As shown, the root is the intent of book hotel. The next level of the tree is the node for the slot of "dates" followed by properties that are needed to satisfy the slot. Each "property" is coupled to a resolver (such as resolvers 811-819). A resolver takes a slot value as input and transforms it into another value. For example, a spoken form number resolver might translate "two thousand eighteen" to "2018."

Resolvers 811-819 may accept scalar values or composite values as input, and output scalar or composite values. For example, a date resolver might accept a scalar value such as "01/05/2018" as input and output a composite value such as "{month: 1, day: 5, year: 2018}." Resolvers can also output multiple resolved values for a single input. For example, a currency resolver could resolve "five oh five" to both "$5.05" and "$505."

In some embodiments, a resolver receives one or more inputs of: configurations (e.g., the configuration preferences of a bot developer, such as the user's current time-zone); options (e.g., options that the resolver needs to do its job, e.g. the URL for a Code Hook resolver or the regex pattern for a regex resolver); slot type (e.g., the name and version of the slot type that was output from the previous resolver); value (e.g., the value that was output by the previous resolver as one of scalar, composite, or union slot type); and/or confidence bin/confidence score (e.g., the confidence bin/score that was output by the previous resolver).

The resolver output is the same as the resolver input with the following differences in that it can return multiple results, so the output is typically a list, and the output does not contain an "options" object.

Depending upon the embodiment multiple resolvers 811-819 may be available. Built-in resolvers 811 solve very specific, language-agnostic problems. Examples of these types of resolvers include: 1) a RegexParserResolver which takes in a string representing part of the user utterance (e.g., "01/05/2018"), a regex pattern to match with the user utterance string (e.g., "([0-9]{2})/([0-9]){2})/([0-9]{4})"), and a list of key/value pairs that map properties to matched regex groups (e.g., "{month: 1, day: 2, year: 3}"), and outputs a dictionary of key/value pairs (e.g. {month: "01", day: "05", year: "2018" }; 2) a RegexReplacerResolver which takes in a string representing part of the user utterance (e.g., "5th"), a regex pattern to match with the user utterance string (e.g., "(th)1(rd)1(nd)"), and a value to replace the matched regex with (e.g., " "), and outputs the user utterance string with the matched parts replaced (e.g., "5")

A script resolver 813 executes a script. This enables more advanced resolution scenarios that require code. Note that other scripting resolvers may also be supported.

An FST resolver 815 allow authors to provide an FST artifact that can be used to translate one string to another. For example, an FST resolver can be used to translate "n. f. l." into "NFL." Examples of an FST Orchestrator are detailed later.

A Code Hook resolver 817 calls an external function to resolve a slot value. For example, the resolver includes remote code to executed to resolve the slot value.

A catalog resolver 819 performs queries on a search cluster to perform resolution of catalog values. For example, the catalog resolver 819 may perform a search of data such as log files, messages, metrics, configurations, etc.

In some embodiments, resolvers are chained together to form a pipeline. This enables more modularity and re-usability of resolvers. For example, consider the following resolvers: "ConvertSpokenFormNumberToWrittenForm" that takes a number like "oh oh five" and outputs "005" and "NormalizeWrittenFormNumber" that takes a number like "005" and outputs "5." These resolvers can be chained together to convert a value like "oh oh five" to "5." A resolver chain can be attached to nodes in the graph by a grammar author. When the resolver orchestrator 803 evaluates a node that has a resolver chain attached, it will pass the output of the last node as input to the resolver chain.

The data hub 311 provides information or data for resolution in some embodiments. For example, build artifacts of slot-types that are used at run-time such as FST artifacts used to power the FST recognizer 833, resolver artifacts storing configurations and other artifacts that power resolvers (e.g., Groovy scripts, Code Hook URL's, etc.), and/or catalog artifacts to be used by FST's for deterministic matching and by the catalog resolver 819 for entity resolution (ER) are stored in the data hub 311. In other embodiments, some or all of this information is stored in, and provided by, the MASS 313.

Figure 13:
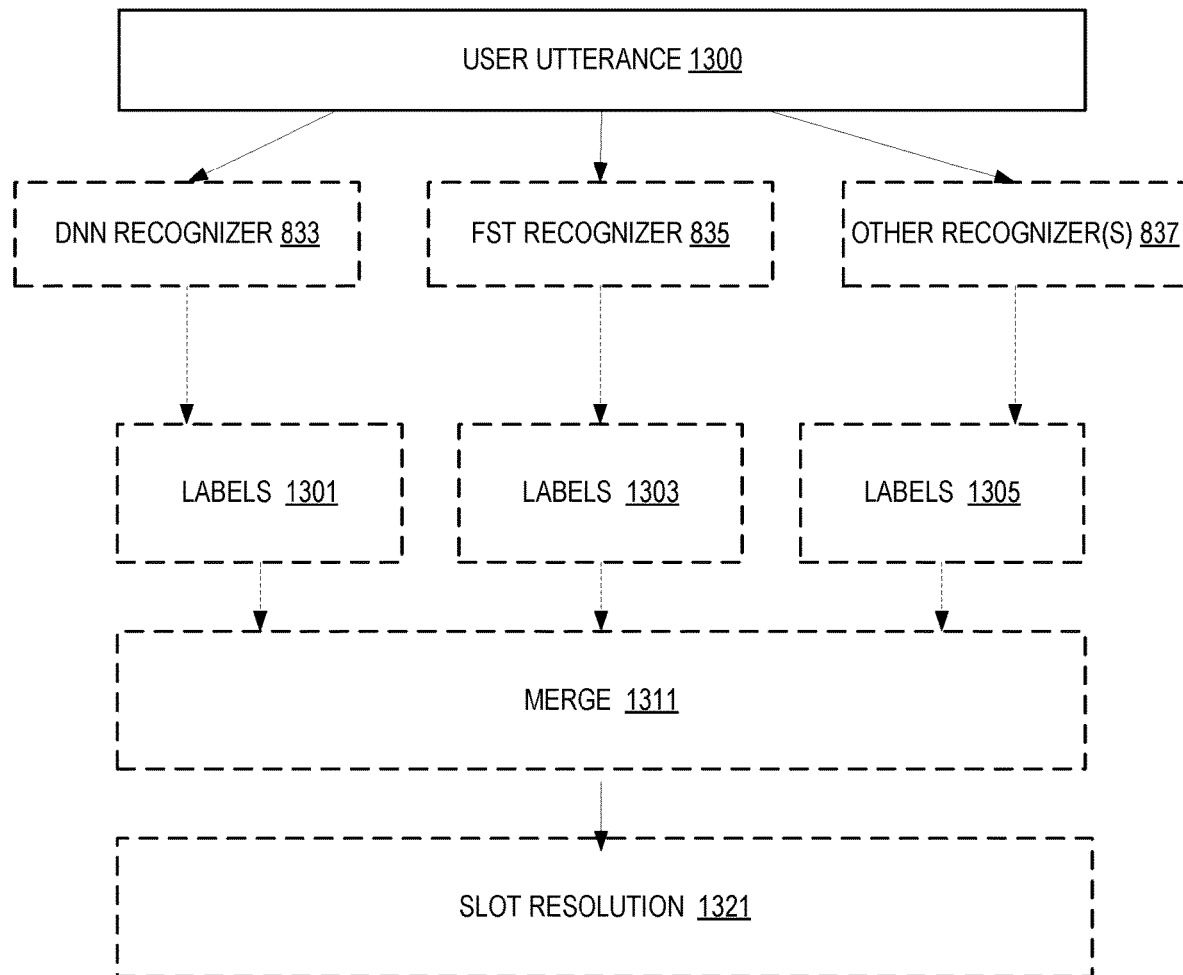
FIG. 13 illustrates high-level examples of embodiments of a flow for handling a user utterance.

FIG. 13 illustrates high-level examples of embodiments of a flow for handling a user utterance. In some embodiments, this flow is performed in an inference worker after the request has been routed, etc. as detailed above.

As shown, a user utterance 1300 is received. An exemplary user utterance 1300 is "I want to book a flight from Dallas to Seattle." The intent of this utterance is to "book a flight" and the slots are the data points that are needed to fulfill that intent.

One or more recognizers 833-835 generate labels (label paths) for the utterance. The labels 1301-1305 are merged at 1311 in the inference orchestrator 803 and resolved into slots 1321 using one or more resolvers 811-819.

Figure 14:
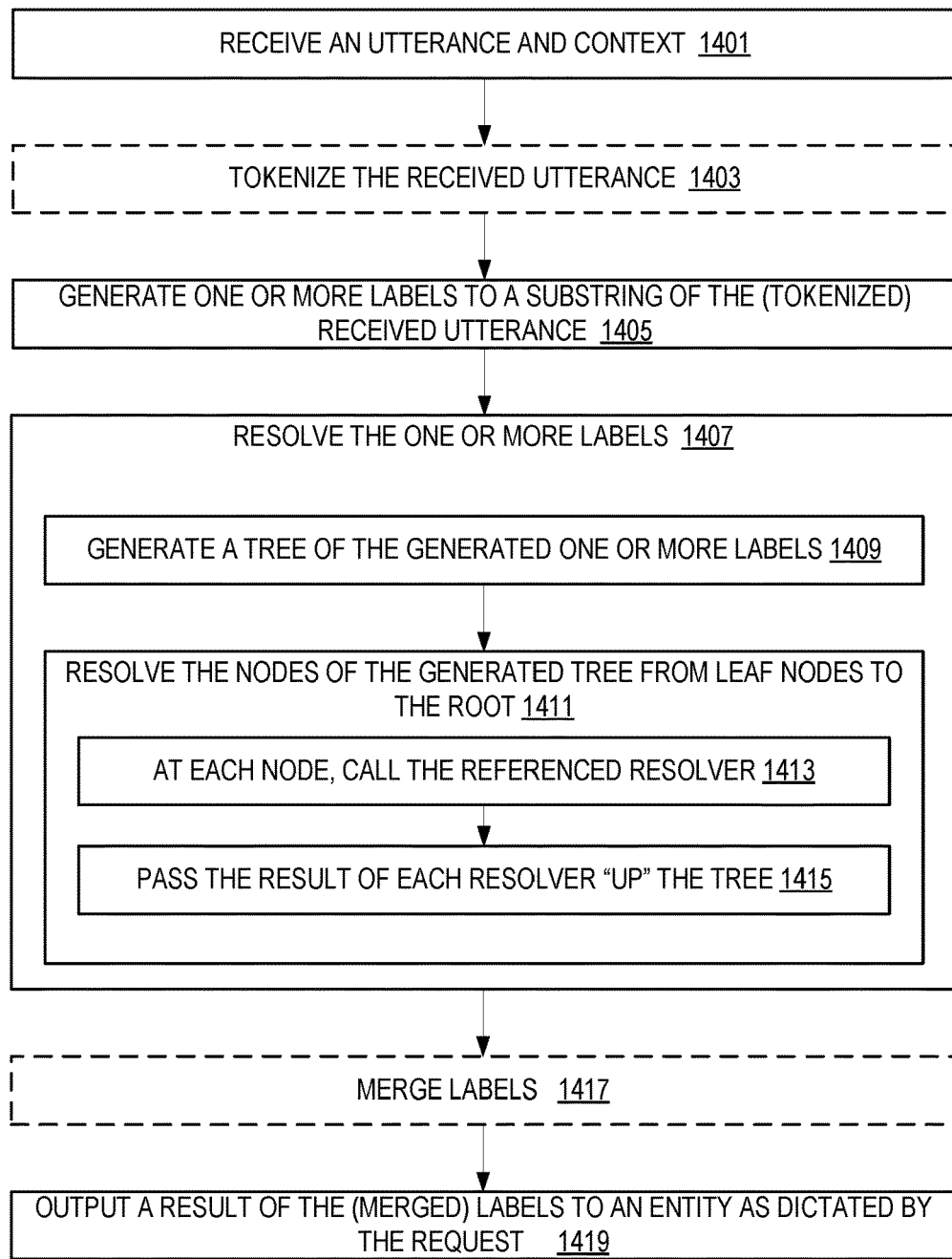
FIG. 14 illustrates examples of embodiments of a method of performing resolving using composite slots.

FIG. 14 illustrates examples of embodiments of a method of performing resolving using composite slots. In some embodiments, this is performed by an inference worker service such as that detailed above with respect to at least FIGS. 5 and 8. Additionally, this resolution may be a part of or all of an inference.

An utterance and context are received at 1401. For example, an utterance from a request to perform an inference is received by an inference worker service of a host. In some embodiments, a bot definition is also received. The bot definition gives slot types.

The received utterance is tokenized at 1403. In some embodiments, this is performed by the pre-processor 831.

One or more labels to a substring of the (tokenized) received utterance are generated at 1405. For example, one or more of the FST recognition component 833 and DNN recognition component 835 generate label paths using a provided grammar.

The one or more generated labels are resolved at 1407. In some embodiments, this resolution includes, as detailed above, generating a tree of the generated one or more labels at 1409 and resolving the nodes of the generated tree from leaf nodes to the root at 1411. Further, during resolution of the nodes, at each rule a reference resolver is called at 1413 (in some embodiments, a mapping of labels to resolvers is provided in a slot type manifest along with slot type definitions and resolver configurations) and the result of each resolver is passed "up" the tree at 1415.

In some embodiments, the results of the resolution of the one or more labels are merged at 1417. For example, a cross-product of the labels is performed.

The (merged) labels are output to an entity as dictated by the request at 1419. For example, in some instances the request comes from and a result is returned to a bot.

Slot types are created and defined by a slot type author. Each slot type is made up of numerous artifacts, including, but not limited to: FSTs, ASR transcriptions, resolvers, training data for machine learning models, and/or test cases for validating that the slot type behaves correctly. Slot types whose values must match a certain pattern are called "grammar-based slot types." Examples include numbers, postal codes, and dates.

Detailed herein is a Domain Specific Language (DSL) as well as a system architecture that enables slot type authors to write a grammar (using the DSL) that defines the patterns that can be matched by their slot type. This grammar can then be used to generate almost all of the artifacts that are needed to produce the slot type and/or aid in training of neural networks.

Figure 15:
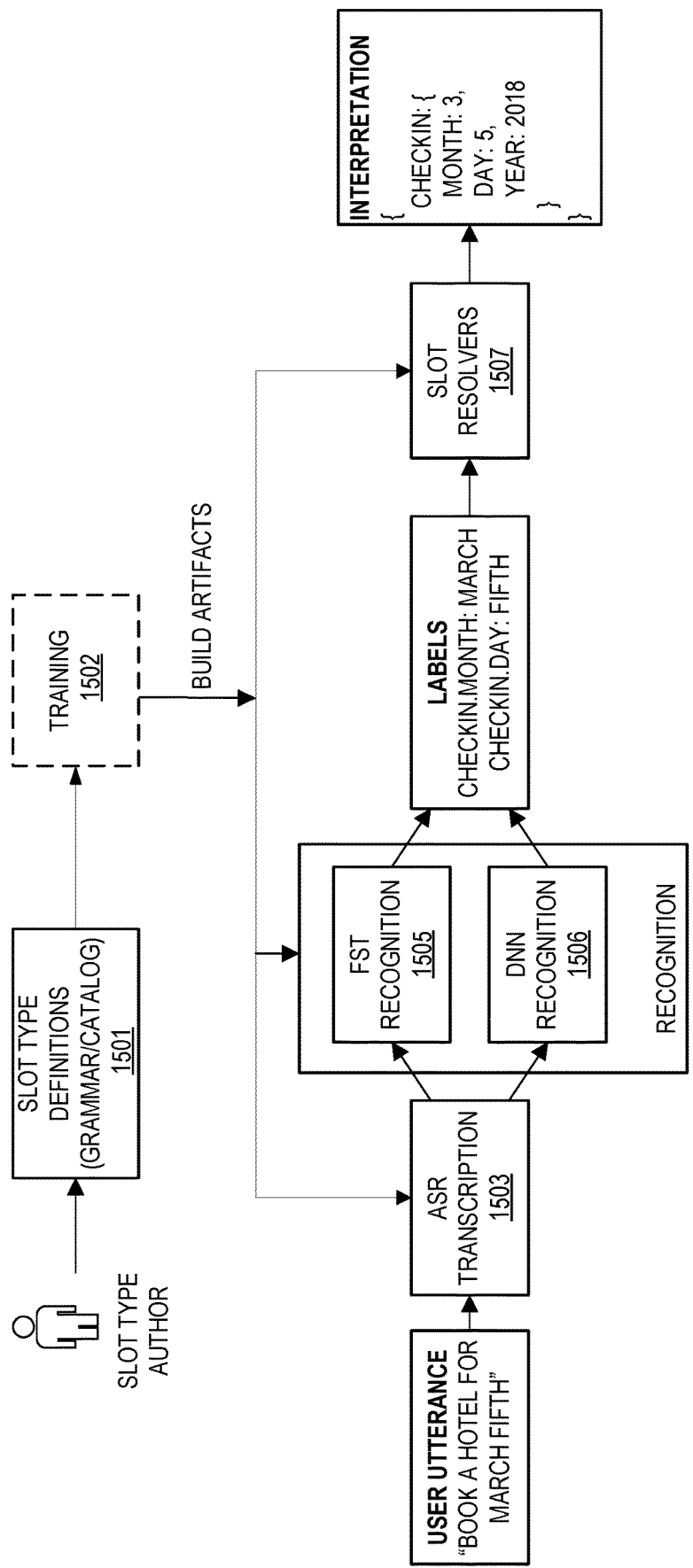
FIG. 15 illustrates examples of embodiments of what type of actors may be built from a grammar.

FIG. 15 illustrates examples of embodiments of what type of actors may be built from a grammar. In this illustration, a slot type author creates or uses slot type definitions (such as a grammar, catalog, and grammar and catalog) 1501 to produce artifacts for ASR transcriptions 1503, FST recognition 1505, DNN recognition 1506, and slot resolving 1507. The flow from user utterance to an interpretation using these entities has been detailed above. In some embodiments, training 1502 is performed using the grammar to generate training data for the DNN recognition 1506.

Figure 16:
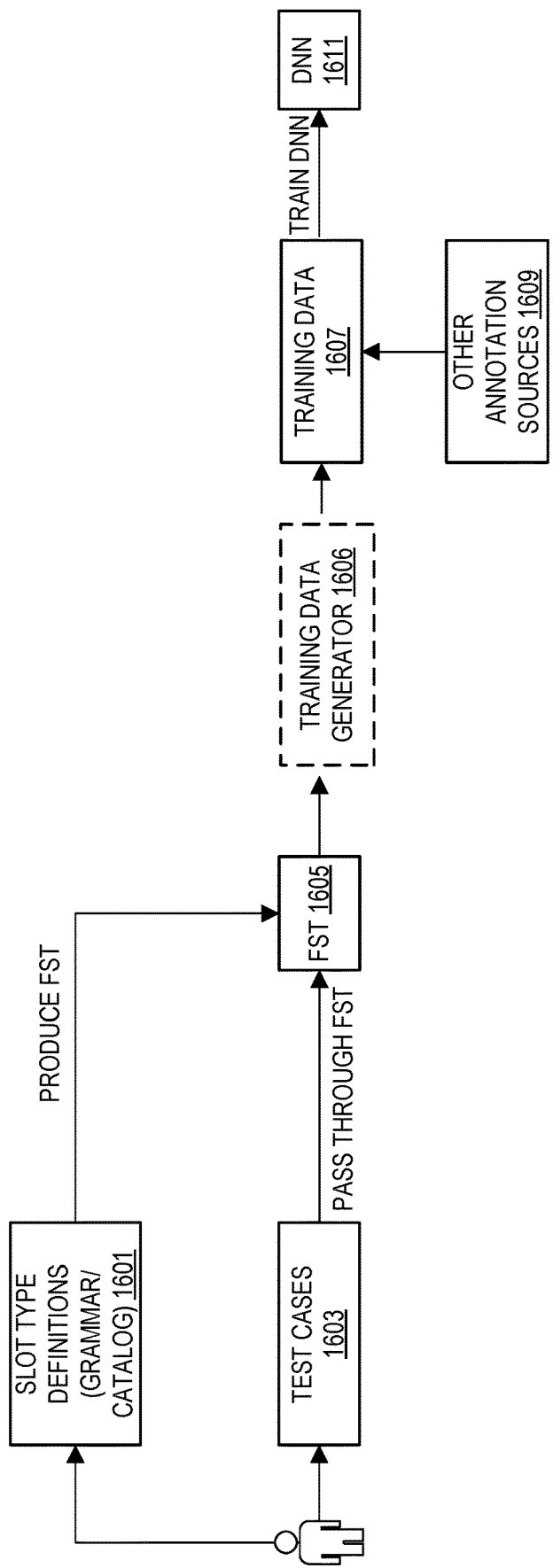
FIG. 16 illustrates examples of embodiments of using slot type definitions (such as a grammar, catalog, and grammar and catalog) to help train a deep neural network (DNN).

FIG. 16 illustrates examples of embodiments of using slot type definitions (such as a grammar, catalog, and grammar and catalog) to help train a deep neural network (DNN). As illustrated, a slot type author creates or uses a grammar 1601 to produce an FST 1605. The slot type author also creates or uses test cases 1603 that are passed through to the FST 1605 for training the FST 1605.

The FST 1605 may be used by a training data generator 1606 to auto-generate training data that can be annotated to become training data 1607 (for example, using annotation applications 301). In some embodiments, training data is automatically generated at 1606. Additionally, in some embodiments, other annotation sources 1609 provide training data. This data is used to train the DNN 1611. For example, the DNN 1611 may be trained in experiment hub 303 and stored as artifacts in MASS 313. Data annotators provide label paths for each scalar value in an utterance, the same way that an inference model would. These annotations can be used for benchmarking performance as well as for training ML models.

In general, the grammar DSL allows for matching of tokens, matching patterns at a sub-token level, differentiating between spoken and written form, labeling granular components of an utterance, and referencing other slot types.

With respect to tokens, the grammar looks at each token individually instead of looking at a sentence as a whole. "Hello, my name is Kevin" would be tokenized as "hello", ",", "my", "name", "is", "kevin" and a grammar rule that matches this would be grammar_rule="hello" "my" "name" "is" "kevin".

A literal matches a single token. For example, the literal "hello" will match the "hello" of the utterance "hello world".

Rules are the backbone of the grammar and are used to match a series of tokens. A rule of hello_world=("hello"|"hi") "world" matches the utterances "hello world" or "hi world".

In some embodiments, rules support the following operators in order of precedence: groupings; repeaters, property assignment, and/concatenation, and logical or. Rules may also reference other types of objects such as literals, other rules, sub-token rules, and slot types. Rules may also be exportable and/or have resolvers attached to them (as noted above).

Figure 17:
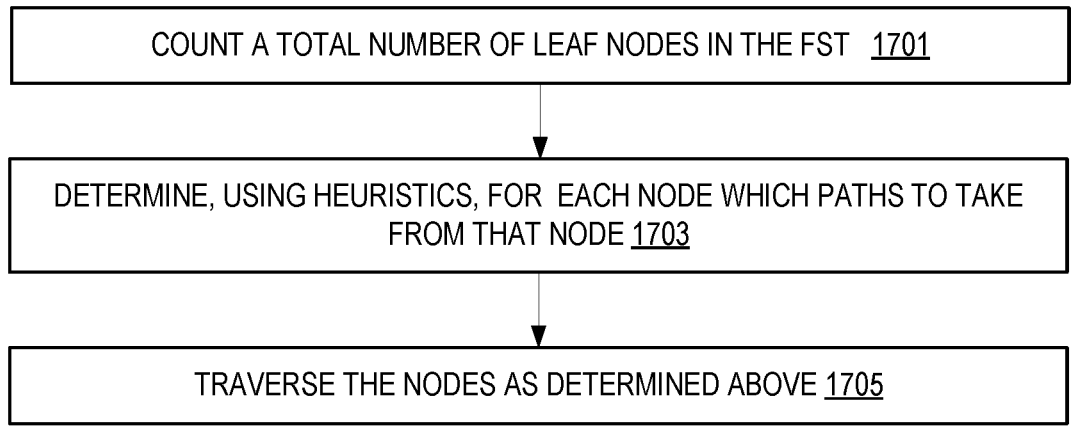
FIG. 17 illustrates examples of a method for automatically generating training data from an FST.

FIG. 17 illustrates examples of a method for automatically generating training data from an FST. This training data can then be used to train a DNN. The DNN expects as input a list of tokenized utterances where each token has a label (e.g., other, startDate, etc.). In some embodiments, this method is performed by authoring tools. A number of target training samples for the DNN sets a mark for the number of training samples to create.

An FST is a graph with states and arcs. Each arc has an input symbol used to match input tokens of an utterance and each state may have several arcs from it.

At 1701, the total number of nodes of the FST are determined. For example, the total number of leaf nodes may indicate the number of nodes to evaluate as a potential path to provide training data.

For each node, a determination of how which paths to take from that node are determined using heuristics such as the quality of the label (its uniqueness, etc.) is made and less desirable paths of the total number of paths are thrown out from consideration at 1703. Note this determination is made until all nodes have been evaluated. These paths are further narrowed down (as necessary) to fit the number of desired values (for example, applying more heuristics to the remaining nodes/paths.

The remaining nodes of the FST are traversed to generate training data at 1705.

FIG. 18 illustrates examples of embodiments of rules of a grammar DSL. A hash tag in this figure is used to indicate a comment about the rule(s) that follow. Examples of rules for matching including series of tokens, spoken, written form numbers using sub-token rules, etc. are shown.

Sub-token rules are used to match individual characters within a single token. This allows for matching patterns that cannot be captured by literal tokens. For example, a written form number must match a pattern like: [0-9]{1,3} ("," [0-9]{3})*. There is no way to express this using literals.

Sub-token rules support the following operators in order of precedence: groupings; repeaters, and/concatenation, and logical or. Sub-token rules can also reference other types of objects such as literals, character sets (e.g., [0-9], [a-z], [0-9a-z], [abcd]), and other sub-token rules (e.g., ordinal suffixes).

Property assignments allow for identifying individual parts of an utterance and working with them separately at resolution time. This makes it easier to break a problem down into smaller parts. Here is an example of assigning the month, day, and year portions of a date to individual properties:

month_rule=("jan"|"feb"| . . . truncated . . . ) as property: month;
token DAY_TOKEN=[1-9]|[12][0-9]|("3" [0-1]);

day_rule=DAY_TOKEN as property:day;
token YEAR_TOKEN=[1-9][0-9]{3};
year_rule=YEAR_TOKEN as property:year;

In some embodiments, when any part of a slot type value is assigned to a property, then only the properties are passed to the resolvers and when no part of the slot type value is assigned to a property, then the entire slot type value is passed to the resolvers.

Slot type references enable for the re-use of recognition and resolution behavior that is defined by other slot types. For example, suppose one wants to build a slot type called "NLU.Date" that should recognize values like "January 5th, 2019 PST". Assume that there already is a slot type called NLU.Month that can recognize values like "january" and "jan" and resolve them to a number like "1" (first month of the year). One can reference the NLU.Month slot type from within the NLU.Date grammar. One could do the same for the other parts (day, year, time-zone) if those slot types exist. For example:
Import the slot types to reference
import slotType NLU.Month version 1;
import slotType NLU.DayOfMonth version 1;
import slotType NLU.Year version 1;
import slotType NLU.TimeZone version 1;
Recognize values like "january 5th, 2019 PST"
date_rule=NLU.Month.name NLU.DayOfMonth "," NLU. TimeZone;

Resolvers enable for the transformation of a labeled value from its raw form to a machine-readable form. In some embodiments, resolvers can be attached to any rule and this causes the rule to be included in the recognition graph detailed above. An example is:
token DIGITS=[0-9]+;
written_form=DIGITS;
spoken_form={
expression: "one"|"two"|"three"| . . . ,
resolvers: [
SpokenFormNumberResolver
]
};
export number=written_form spoken_form;

In this example, the spoken_form pattern will be included in the label path because the spoken_form pattern is treated differently than the written_form pattern. The SpokenFormNumberResolver is executed whenever the spoken_form pattern is identified in an utterance.

Figure 19:
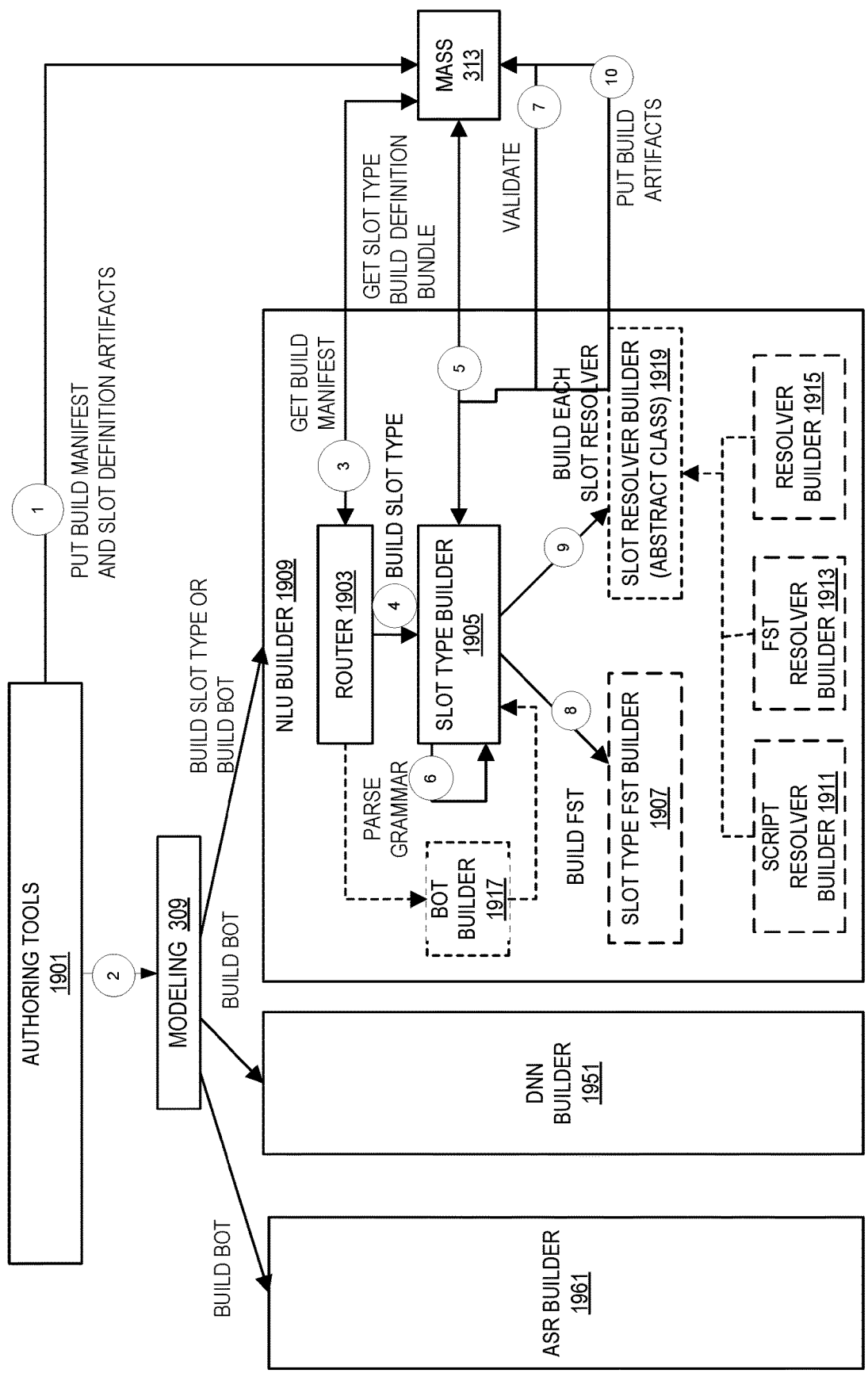
FIG. 19 illustrates examples of building a slot using a grammar.

FIG. 19 illustrates examples of building a slot using a grammar. Authoring tools 1901 are used by a slot type author to build a manifest that lists all files, etc. that are to be written or read by a build and what type of item to build (a slot or bot), and build slot definition artifacts (such as a grammar, annotated data, and slot type definitions). A slot type definition defines resolution activities for the slot type. These items are stored in MASS 313 at circle 1. The authoring tools 1901 may also create training data for training a DNN, etc. from FSTs.

The authoring tools 1901 may also be used to send a build command (slot type and/or bot) at circle 2 to the NLU builder 1909, DNN builder 1951, and/or ASR builder 1961. The NLU builder 1909 utilizes a router 1903 to get the build manifest from MASS 313 at circle 3.

To build a slot type, the router 1903 then sends a build slot type command to the slot type builder 1905 at circle 4. In some embodiments, for bot building, the router 1903 sends a bot build command to the bot builder 1917 which then calls the slot type builder 1905 for any slots in the bot definition. The slot type builder 1905 retrieves the slot type definition bundle at circle 5. A grammar slot type build definition bundle may include one or more of a slot type definition (as detailed above), a grammar DSL, resolver information such as a script or FST grammar, and an annotated catalog for training a DNN. A catalog slot type build definition bundle includes a slot type definition and catalog values. What information is included in the bundle is dependent upon what type of slot type is to be built.

For a grammar-based slot type, the slot type builder 1906 parses the grammar DSL to determine how to build a recognition FST and/or a resolver grammar(s) to build a resolver FST at circle 6. In some embodiments, the slot type builder 1906 performs one or more validations of the grammar, slot type definitions, dependencies, etc. at circle 7. For example, the slot type builder 1906 may validate that there are not different versions of the same slot type stored in MASS 313, validate the grammar for dependencies that exist in the MASS 313, and/or validate that properties and patterns do not have the same name.

The slot type builder 1905 calls a slot type FST builder 1907 to compile a recognition FST from the grammar DSL bundles of the slot type build definition bundle at circle 8 and/or calls a slot resolver builder 1919 to call one or more resolver builders (such as Groovy resolver builder 1911, FST resolver builder 1913, and/or resolver builder 1915 which takes catalog values, put them into elastic search, and save a manifest file on how to query during runtime) based on resolver bundles of the slot type build definition bundle at circle 9. Any build artifacts are stored in MASS 313 at circle 10.

The DNN builder 1951 gets a bot definition which contains a list of intents with slots that have slot types. The intents also include sample utterances which have placeholders for slot values. The utterances are expanded with values as training data (annotated data) and used for training the ML model and the artifacts are stored in MASS 313. For catalog slot types, the values are sampled from a supplied catalog. For grammar slot types, the values are the output of an FST generated from a supplied grammar.

The ASR builder 1961 generates a static language model and a supplemental model for the bot. FSTs are built out of the grammar or catalog supplied, and then used to build a ASR ML model.

Figure 20:
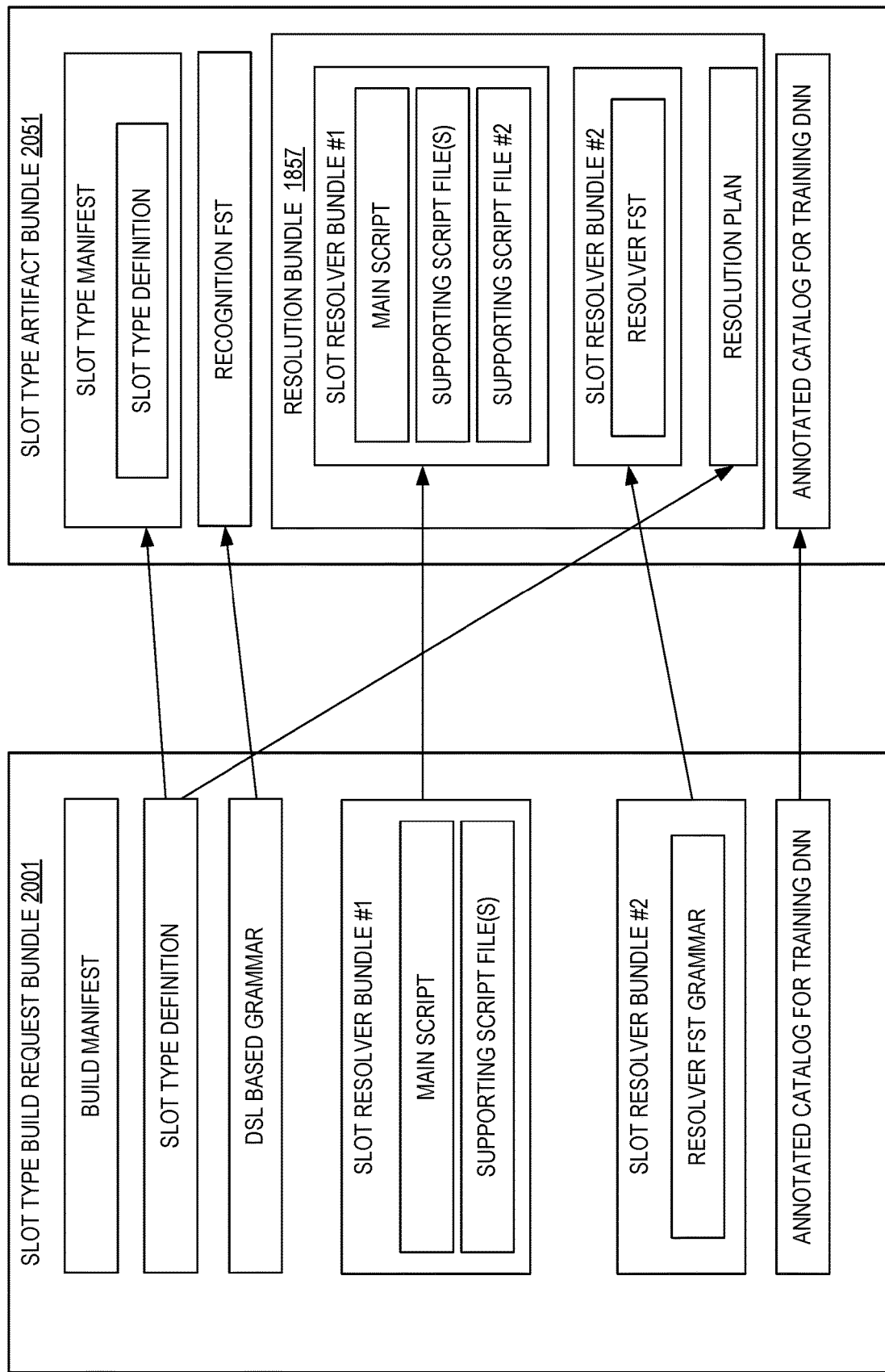
FIG. 20 illustrates an example of a grammar slot type build definition request bundle used in the build process and a corresponding slot type artifact bundle to be stored after the build process.

FIG. 20 illustrates an example of a grammar slot type build definition request bundle 2001 used in the build process and a corresponding slot type artifact bundle 2051 to be stored after the build process. As shown by the arrows in FIG. 20, slot type definitions are used to define a slot type manifest (that includes a slot type definition) and resolution plan (that includes the resolver configurations and label-to-resolver mappings).

The DSL based grammar is used to build the recognition FST. Similarly, the FST grammar is used to build a resolver FST. What information is included in the bundles is dependent upon what type of slot type is to be built. For example, if no resolvers are to be built, then the request bundle does not need to include information relative to a resolver, etc.

Additionally, annotated catalog information is stored as shown.

Figure 21:
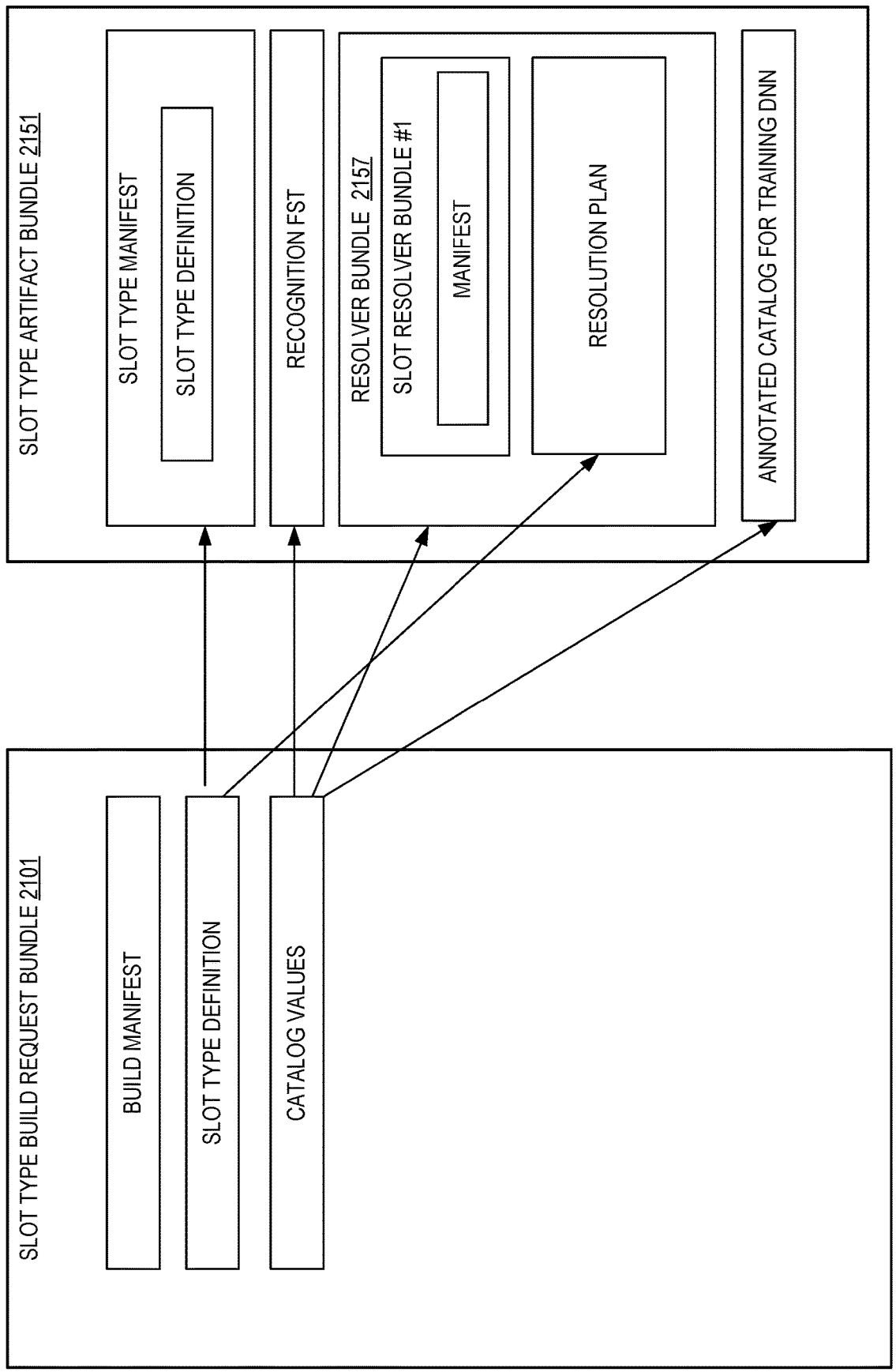
FIG. 21 illustrates an example of a catalog slot type build definition bundle and a corresponding slot type artifact bundle.

FIG. 21 illustrates an example of a catalog slot type build definition bundle 2101 and a corresponding slot type artifact bundle 2151. As shown, by the arrows in FIG. 21, slot type definitions are used to define a slot type manifest which includes the slot type definition. The slot type definitions and catalog values are used to develop a resolution plan similar to that detailed in FIG. 20. The catalog values are also used to build a recognition FST (using slot type FST builder 1907) and one or more resolvers using slot resolver builder 1919.

Figure 22:
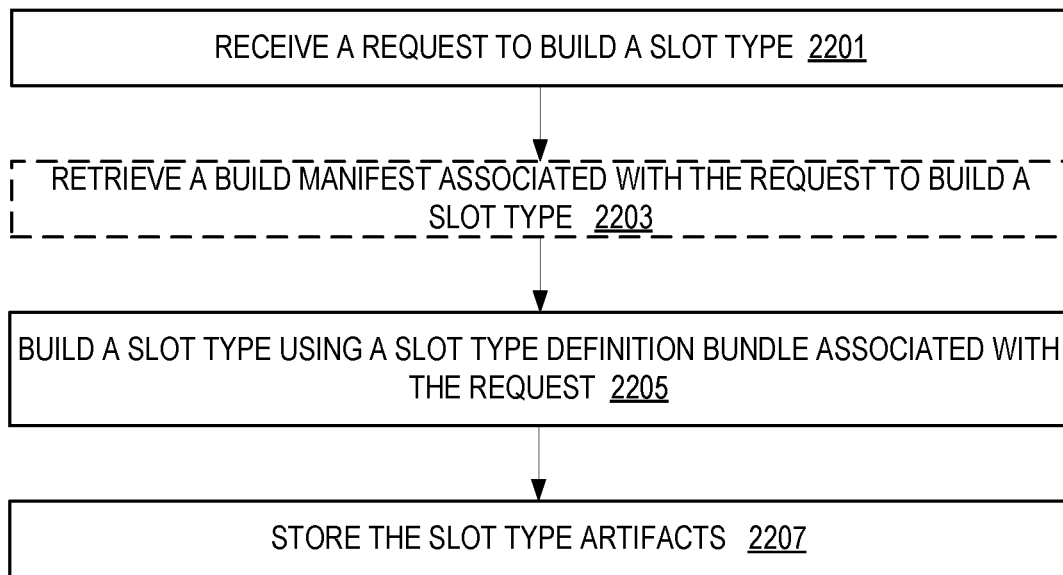
FIG. 22 illustrates examples of embodiments of a method of building a slot type from a grammar.

FIG. 22 illustrates examples of embodiments of a method of building a slot type from a grammar. In some embodiments, this is performed by NLU builder 309.

A request to build a slot type is received at 2201. In an embodiment, this request identifies a build manifest to retrieve from storage such as MASS 313.

The build manifest associated with the request to build a slot type is retrieved at 2203. In some embodiments, the build manifest is a part of a slot type build definition bundle such as those illustrated in FIGS. 20 and 21. In other embodiments, the build manifest is a standalone file that references a slot type build definition bundle and that bundle is also retrieved.

A slot type is built using the slot type definition bundle associated with the request at 2205. In some embodiments, this slot type definition bundle is a part of the request itself. In other embodiments, at least some of the slot type definition bundle is stored and the request or build manifest provides a location for the bundle. For example, the request and/or build manifest provides a location in MASS 313. For example, the slot type builder 1905 parses received grammars, performs validation, and calls various builders to build a slot type according to the grammar and/or catalog values of the slot type build definition bundle.

At 2207, any slot type artifacts of the built slot type are stored.

FSTs are commonly used for deterministic matching of text such as matching utterances during intent recognition and slot labeling discussed above. For example, the sample utterance of "I want to order {number} pizzas" should accept values like 1, 11, eleven, 111, etc., or "My employee id is {employee-id}" should accept an employee id expressed in the form of a regex [a-z]{1,3}-[0-9]{1,2} and an employee id slot type should accept values like ab-12, abc-1, etc.

FSTs for such pattern-based slot types accept inputs tokenized as characters since it is not possible to enumerate all the acceptable word combinations for a pattern in the FST.

Typically, grammar-based slot type FSTs require character-based tokenization and catalog-based slot type and intent FSTs are normally tokenized at word level to optimize FST sizes. Detailed herein are improvements to FSTs that utilize a data structure that is a variant of traditional FSTs. This data structure allows instructions to be embedded within the FST. These instructions can be interpreted by a process (actor) as it traverses the FST graph, allowing the process to perform actions other than simply matching tokens. Exemplary instructions include those that allow for, but are not limited to: switching between matching words or characters within the same FST (rather than one or the other), repeating the same pattern numerous times without expanding the size of the FST, referencing other FSTs, and/or calling out to external functions, such as performing a query.

Further, traversing the FST using an orchestrator is discussed such as maintaining state as it traverses the graph, storing snapshots whenever a branching point is reached, etc. and restoring the state of the last branching point whenever a terminal point in the FST graph is reached.

Figure 23:
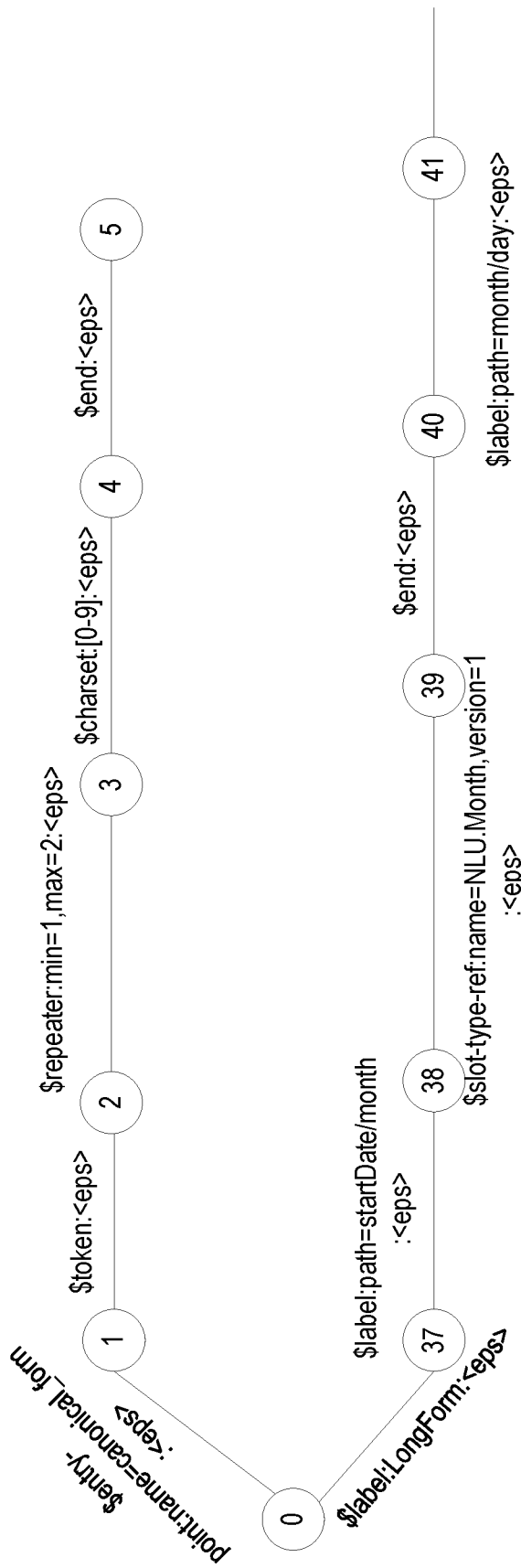
FIG. 23 illustrates an example of embodiments of an FST graph data structure that utilizes instructions.

FIG. 23 illustrates an example of embodiments of an FST graph data structure that utilizes instructions. In this particular illustration, the FST graph includes an instruction for switching between character and token-based analysis. In general, an instruction has a format of $instructionName: parameter 1=value 2, parameter 2=value 2.

Examples of instructions include, but are not limited to: an intent instruction (e.g., $intent:name=BookHotel) which is used to indicate an FST path that matches an intent; a slot instruction (e.g., $slot:name=numberOfGuests) which is used to indicate that all FST arcs between this instruction and the $end instruction belong to a slot (in the example, the numberOfGuests slot); a slot-type instruction (e.g., $slot-type-ref:name=NLU.Number) which is used to points to a slot type (in the example, input tokens should be matched with the NLU.Number slot type from this point until a terminal state is reached in the NLU.Number FST, then resume matching on the current FST); an entry point instruction (e.g., $entry-point:name=integer,isDefault=true) used to provide multiple entry points into an FST (for example, NLU.Number might support "integer" form as well as "decimal" form. The $slot-type-ref instruction can specify an entry point. If it does not specify an entry point, then the entry point with isDefault=true is used); a label instruction (e.g., $label:path=date/month) used to indicate that all FST arcs between this instruction and the $end instruction should be labeled as date/month; a token instruction (e.g., $token) used to indicate a start of consumption of the input character-by-character instead of token-by-token (in some embodiments, the FST is consumed sub-token instead of character-by-character); a character instruction (e.g., $charset:min=a, max=z) that indicates the next input character should be between defined values (in this example, between "a" and "z"); a literal instruction (e.g., literal) used to indicate the next input token (if in token mode) or character (if in sub-token mode) should match the literal (note this is a default instruction and may not start with a "$"); and an end instruction (e.g., $end) marks the end of the current span (such as $slot, $label, or $token).

As shown, the root (circle 0) has two paths, a first path (the upper path) that is to be labeled using a canonical form of slot type references and a second path (the lower path) that is to be labeled using a long form of slot type references. The $ symbol in this FST graph indicates the use of an instruction on how to evaluate a particular node (arc).

In this example, there several instructions, but of particular relevance is the $token instruction. It is this instruction which dictates that an FST arc is to switch to/from character level tokenization analysis from word level tokenization analysis.

Following the path 0→1→2→3→4→5 indicates that the output tokens should be labeled in canonical form and charset:[0-9] is repeated between 1 to 2 times (as dictated by the $repeater instruction (which may not be needed) and $charset instruction). As such, these arcs can then capture numerical patterns 1, 11, etc.

Similarly, the path 0→37→38→39 indicates that the output tokens should be labeled in long form and a value of the property of month ($property is an instruction indicating what property is to be found) is to be matched by calling into another FST called NLU.Month:1.0 ($slot-type-ref is an instruction to call another FST) and following the path with an arc labeled "Name" within it.

FST graphs are recursively traversed and any property and label values generated by the traversal are then consumed by the slot resolver. In some embodiments, the traversal is essentially a recursive, depth-first-traversal of the FST graph. For example, each token (or character) in the user utterance is compared with the arcs on the FST graph as it is traversed. When an arc is reached that does not match the current token (or character), the traversal of that path is stopped, and the traversal process is backtracked to the previous branching point and continued down the next path from that branching point using a snapshot. When a terminal state is reached, a match is recorded and a next path off of the last branching point is evaluated until there are no more paths to traverse.

Figure 24:
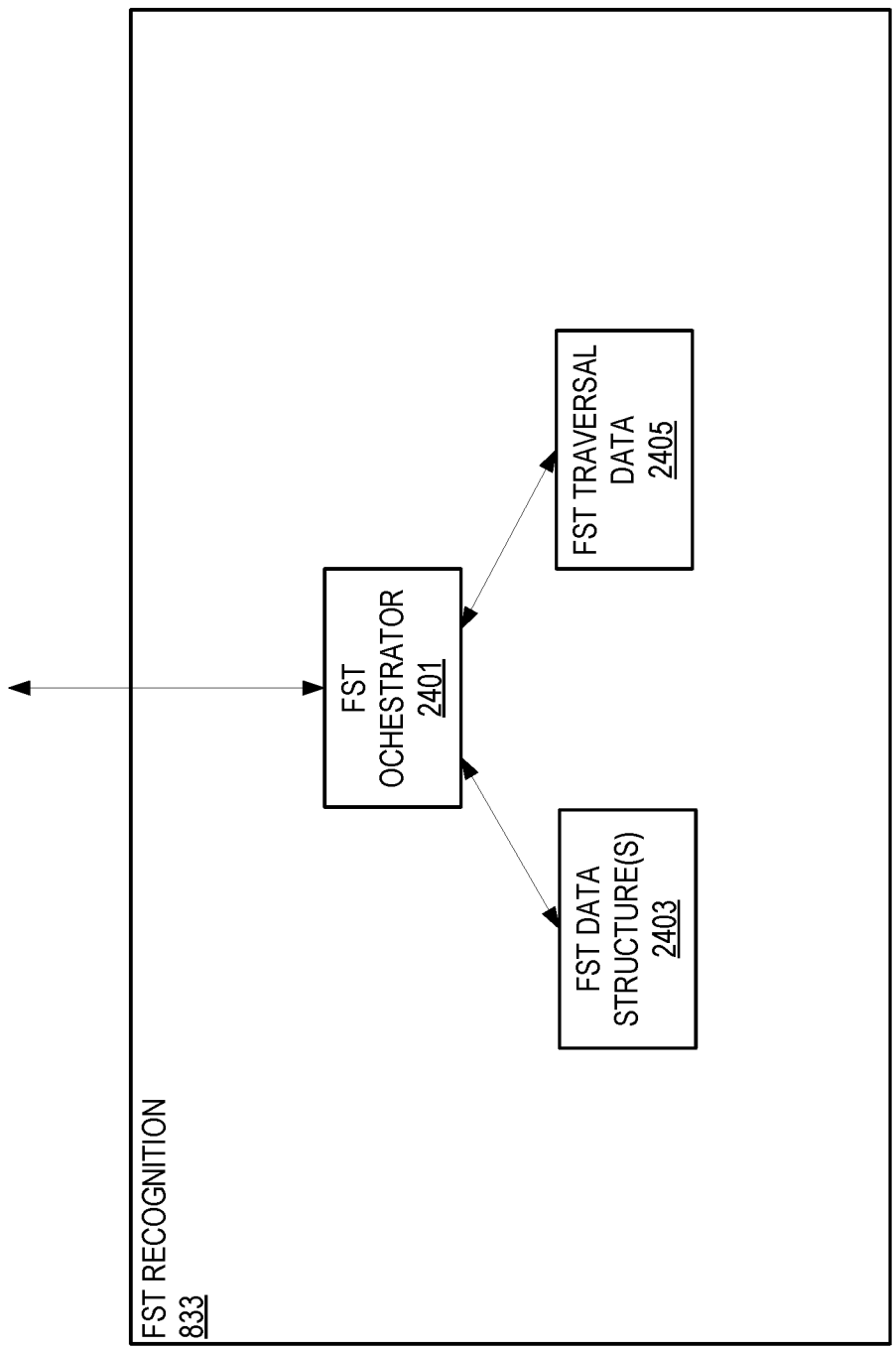
FIG. 24 illustrates an FST recognition component that includes an FST orchestrator to handle the traversal of an FST data structure that includes instructions.

FIG. 24 illustrates an FST recognition component that includes an FST orchestrator to handle the traversal of an FST data structure that includes instructions. In particular, the FST orchestrator 2401 tokenizes the utterance (if not done already) and uses the tokenized utterance to traverse one or more FST data structures 2403 that include instructions. Note that the traversal of a first FST data structure may require a traversal of another FST data structure based upon an instruction to do so, as discussed above.

As noted above, the FST orchestrator evaluates each branch of the FST according to the instructions that are in that branch and maintains the position of the traversal including branching points and a snapshot at each branching point, results of the traversal (matches), and which branches have already been traversed in the FST traversal data 2405. In some embodiments, the FST traversal data 2405 includes one or more stacks used to maintain breakpoints and which branches have been evaluated, with instructions popped on and off the stack during evaluation. Further, in some embodiments, the FST traversal data 2405 includes each result, as more than one label, property, etc. may result from the traversal.

Figure 25:
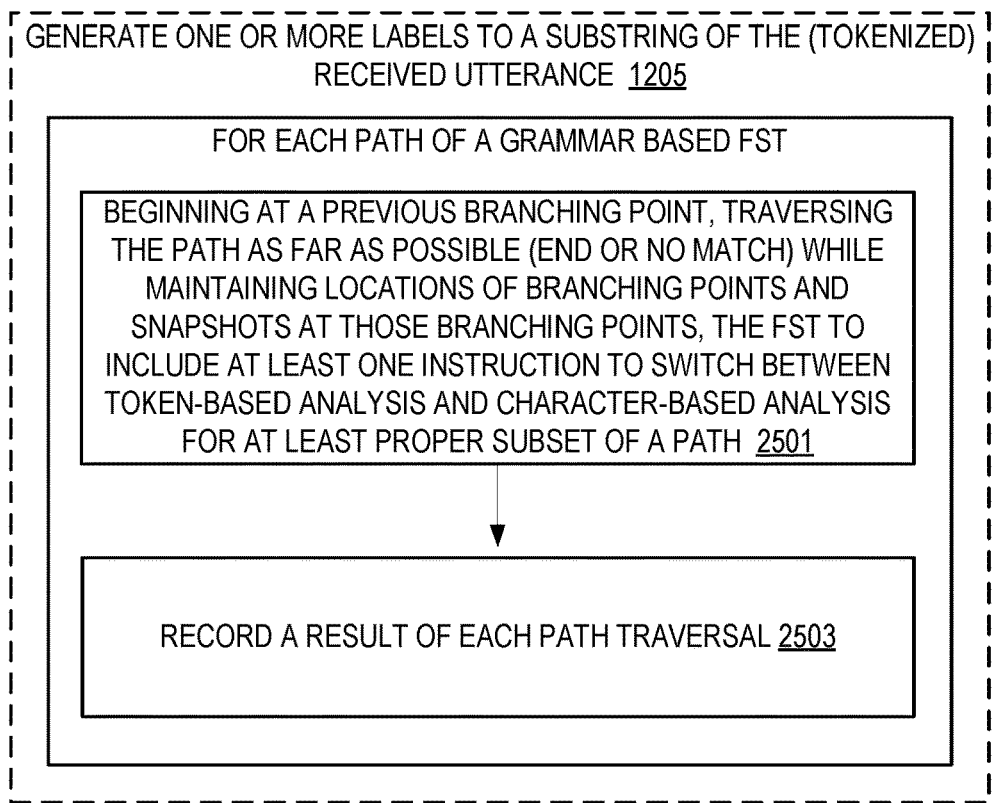
FIG. 25 illustrates examples of embodiments of a method of generating one or more labels for a received tokenized utterance.

FIG. 25 illustrates examples of embodiments of a method of generating one or more labels for a received tokenized utterance. In some embodiments, this is box 1205 of FIG. 12. In some embodiments, this method is performed by an FST orchestrator.

The following two activities are performed per path of the FST orchestrator.

Beginning at a previous branching point, the path is traversed as far as possible by looking for matches at each arc with the end being either no match or a terminal node, while maintaining locations of branching points and snapshots at those branching points at 2501. The FST includes at least one instruction to switch between token-based analysis and character-based analysis for at least a proper subset of a path. Note that snapshots allow for the traversal to start from a branching point instead of having to go all the way back to the root node.

At 2503, the results (label, property, nothing, etc.) of each path traversal is recorded made available to be provided for slot resolution.

Figure 26:
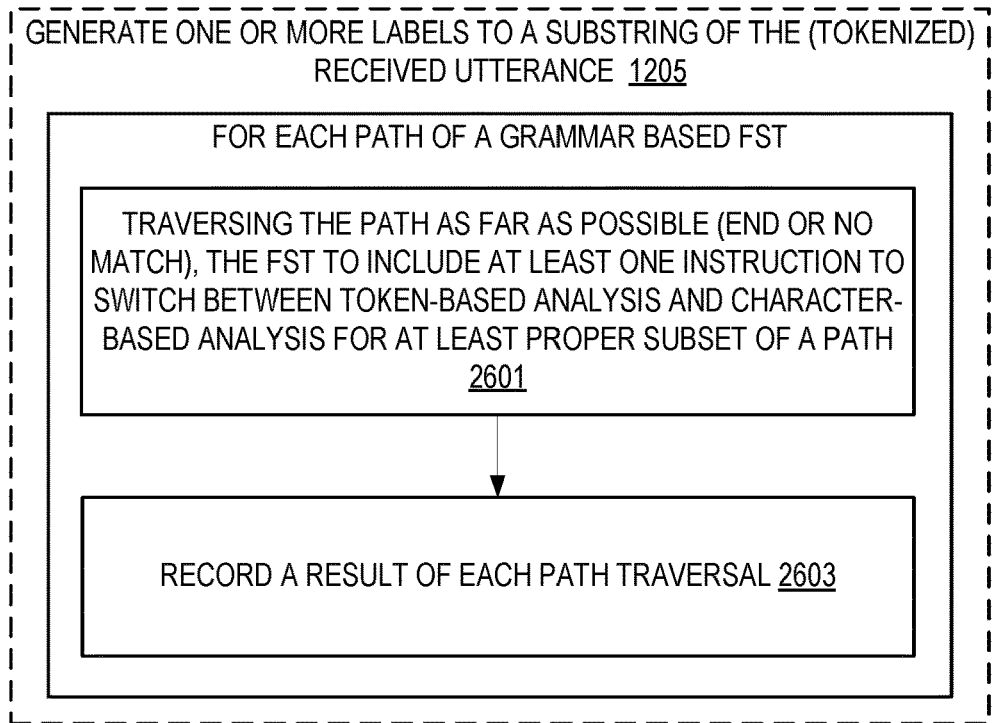
FIG. 26 illustrates examples of embodiments of a method of generating one or more labels for a received tokenized utterance.

FIG. 26 illustrates examples of embodiments of a method of generating one or more labels for a received tokenized utterance. In some embodiments, this is box 1205 of FIG. 12. In some embodiments, this method is performed by an FST orchestrator.

The following two activities are performed per path of the FST orchestrator.

The path is traversed as far as possible by looking for matches at each arc with the end being either no match or a terminal node at 2601. The FST includes at least one instruction to switch between token-based analysis and character-based analysis for at least proper subset of a path. Note that without snapshots the traversal starts from the root node.

At 2603, the results (label, property, nothing, etc.) of each path traversal is recorded and made available to be provided for slot resolution.

Figure 27:
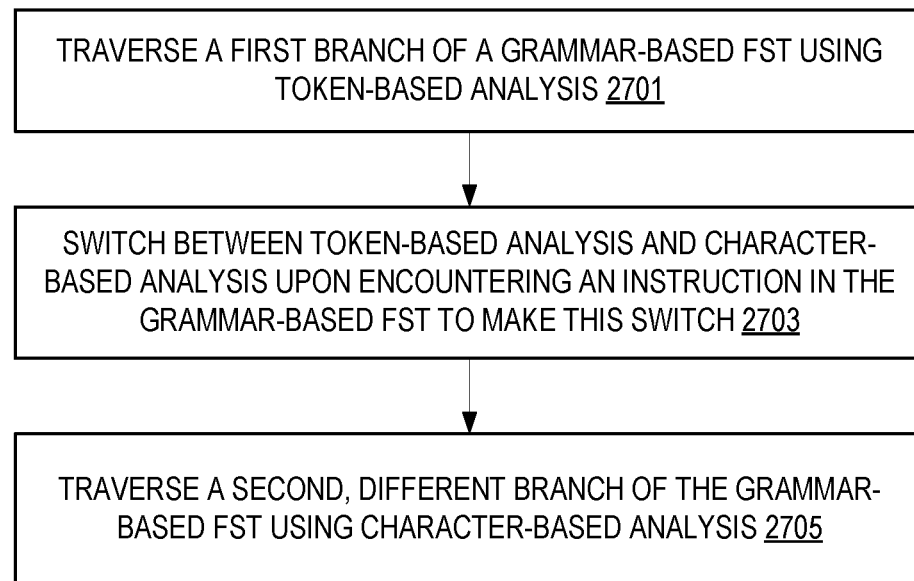
FIG. 27 illustrates examples of embodiments of traversal of an FST including switching.

FIG. 27 illustrates examples of embodiments of traversal of an FST including switching. This may be a part of boxes 2501 or 2601. This does not show the storing of any results which would of course occur as shown in FIGS. 25 and 26.

A first branch of a grammar based FST is traversed using token-based analysis by the FST orchestrator at 2701.

The FST orchestrator switches between token-based analysis and character-based analysis upon encountering an instruction in the grammar based FST to make this switch at 2703.

A second, different branch of the grammar based FST is traversed using character-based analysis by the FST orchestrator post switch at 2705.

Figure 28:
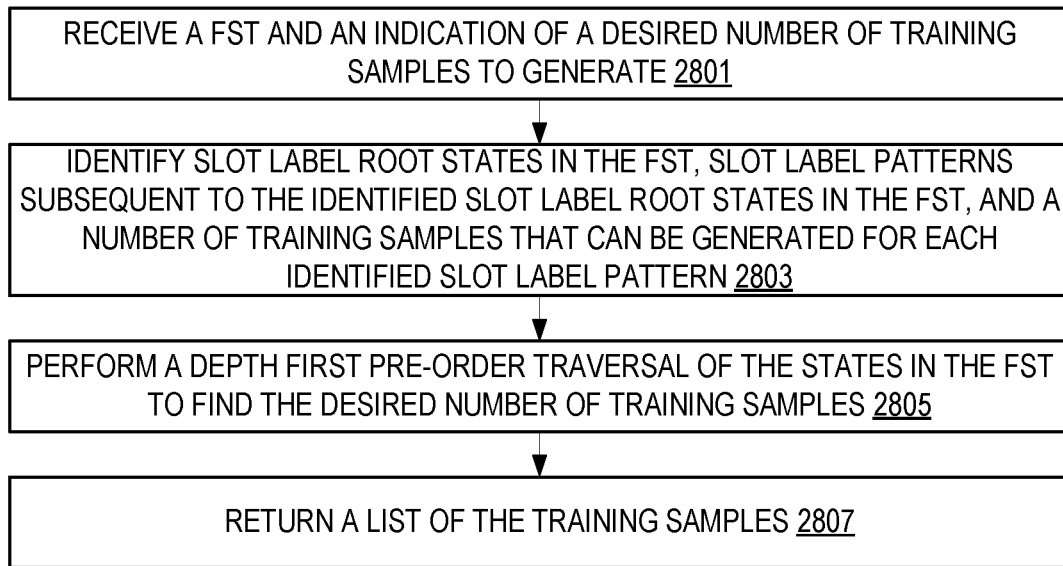
FIG. 28 illustrates examples of embodiments of a method for using an FST to generate training data.

As indicated above, in some embodiments an FST is used to generate training data. FIG. 28 illustrates examples of embodiments of a method for using an FST to generate training data. In some embodiments, embodiments of this method are performed by training data generator 1606.

Prior to detailing embodiments of the method, a few definitions are provided. A slot label pattern is a set of slot labels that are found in an FST path. For example, one FST path that matches "January 1st 2018" might contain the slot label set ["date/month", "date/day", "day/year" ]. A path that matches "7 days ago" would contain the slot label set ["date/amount", "date/unit", "date/direction" ]. Note that the ["date/month", "date/day", "day/year"] set might appear multiple times in the FST and represent different patterns. For example, "January 5th, 2018" and "01/05/2018" may have the same set of labels, but represent different patterns. These may be considered two different slot label patterns to be identified by something other than the slot labels they contain such as GUIDs or an auto-incrementing ID.

A slot label pattern root state is a state in the FST that satisfies the following constraints: (1) no arc that appears before this state in an FST path has a $label instruction, and (2) at least one arc that appears after this state in an FST path has a $label instruction. Note that a single state can be the root state for multiple slot label patterns. For example, imagine that state S has an outgoing arc "$label:name=date/month". The next state then has two outgoing arcs: one for "$label:name=date/day" and another for "$label:name=date/year". This means that state S is the root state for the slot label patterns ["date/month", "date/day" ] and ["date/month", "date/year" ].

A training sample is a single sample of training data for the DNN. A training sample is represented as a list of (token, label) tuples. Each path in the FST (from start state to terminal state) represents a potential training sample. An example is: [("from", "Other"), ("January", "startDate/month"), ("the", "Other"), ("5th", "startDate/day"), ("to", "Other"), ("the", "Other"), ("8th", "endDate/day")].

At 2801, an FST and an indication of a desired number of training samples to generate from the FST are received. In some embodiments, these are received as a part of, or in response to, a request to generate training samples.

At 2803, the slot label root states in the FST and with the slot label patterns that appear underneath those states in the FST are identified along with a number of training samples that can be generated for each slot label pattern. In some embodiments, a count of a total number of training samples that can be generated below each state, independent of slot label patterns, is made. This information should be propagated "up" the FST to the start state with each state being an accumulation of the states below it.

In some embodiments, this is performed by a post-order depth-first search traversal of the FST. A result of this activity is that each state has metadata describing it. In some examples, for a state that appears at or above a slot label root state the metadata looks like:

```
{
slotLabelPatterns: [
    {slotLabelPattern:  <GUID-1>,  numberOfTraining-
        Samples: AAA},
    {slotLabelPattern:  <GUID-2>,  numberOfTraining-
        Samples: BBB}
],
    numberOfTrainingSamples: AAA+BBB
}
```
For a state that appears below a slot label root state the metadata looks like:
```
{
    slotLabelPatterns: [ ],
    numberOfTrainingSamples: XXX
}
```

At 2805, a depth-first pre-order traversal of the states in the FST is performed to find the desired number of training samples.

At 2807, the list of training samples found by the depth-first pre-order traversal of the states in the FST is returned.

Figure 29:
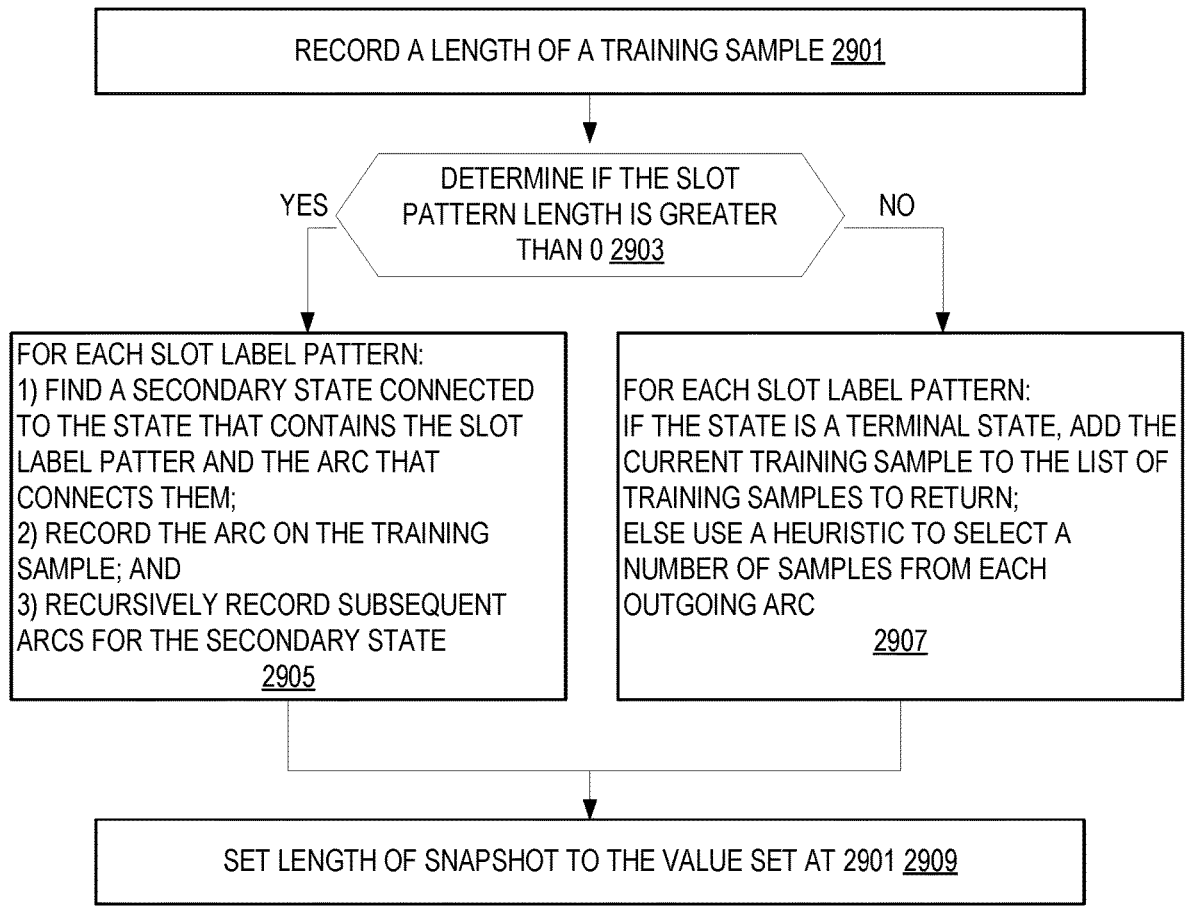
FIG. 29 illustrates examples of embodiments of a depth-first pre-order traversal of a state in the FST is performed to find the desired number of training samples.

FIG. 29 illustrates examples of embodiments of a depth-first pre-order traversal of a state in the FST is performed to find the desired number of training samples. While not shown, an empty list of training samples, and a training sample T that acts as a stack as the FST is traversed, are initialized as needed. Further, what is illustrated is to be repeated for each state S of the FST.

At 2901, a length of T is recorded. This allows for setting the stack back to its current state after visiting S.

A determination of if the slot pattern length for the state S is greater than 0 is made at 2903. For each slot label pattern with a length greater than 0, at 2905: 1) a secondary state S2 connected to the state S that contains the slot and the arc A that connects the states are found; 2) the arc A is recorded on the training sample; and 3) subsequent arcs are recorded for state S2, passing along the new value for a desired number of training samples (for example, the desired number of training samples divided by the length).

Recording of arcs may be as follows: 1) when A is a literal instruction, then record A as a token on training sample T; 2) when A is a $charset instruction, then randomly select a character in the charset range and record it as a character on training sample T; 3) when A is a $token instruction, then switch to character-mode; and 4) when A is an $end instruction corresponding to a $token instruction, then record the characters captured within this $token span as a token on training sample T, then switch to token-mode.

For each slot label pattern with a length of 0, at 2907, if the state S is a terminal state, then the current training sample T is added to the list of training samples to return, otherwise a heuristic (such as a uniform distribution) is used to select a number of samples from each outgoing arc.

For example, suppose the following outgoing arcs and their destination states exist:
```
[
    {inputSymbol: "arc1", destinationState: {numberOfT-
        rainingSamples: 5} },
    {inputSymbol: "arc2", destinationState: {numberOfT-
        rainingSamples: 3} }
    {inputSymbol: "arc3", destinationState: {numberOfT-
        rainingSamples: 7} }
]
```
There are a total of 15 samples to choose from. Assume that the samples for "arc1" are numbered 1-5, "arc2" are 6-8, and "arc3" are 9-14. If the desired number of training samples is 4, and the heuristic decides to choose samples 1, 7, 10, and 14, sample 1 falls into "arc1", sample 7 falls into "arc2", and samples 10 and 14 fall into "arc2". This means that one sample is collected from arc1, one from arc2, and two from arc3.

For each of these arcs A, the arc is record on the current training sample as detailed above with respect to 2905 and this is recursively performed, passing on the desired number of training samples for the current arc A (1 for "arc1", 1 for "arc2", and 2 for "arc3").

At 2909, the length of the training sample T is set back to the snapshot recorded in 2901.

Figure 30:
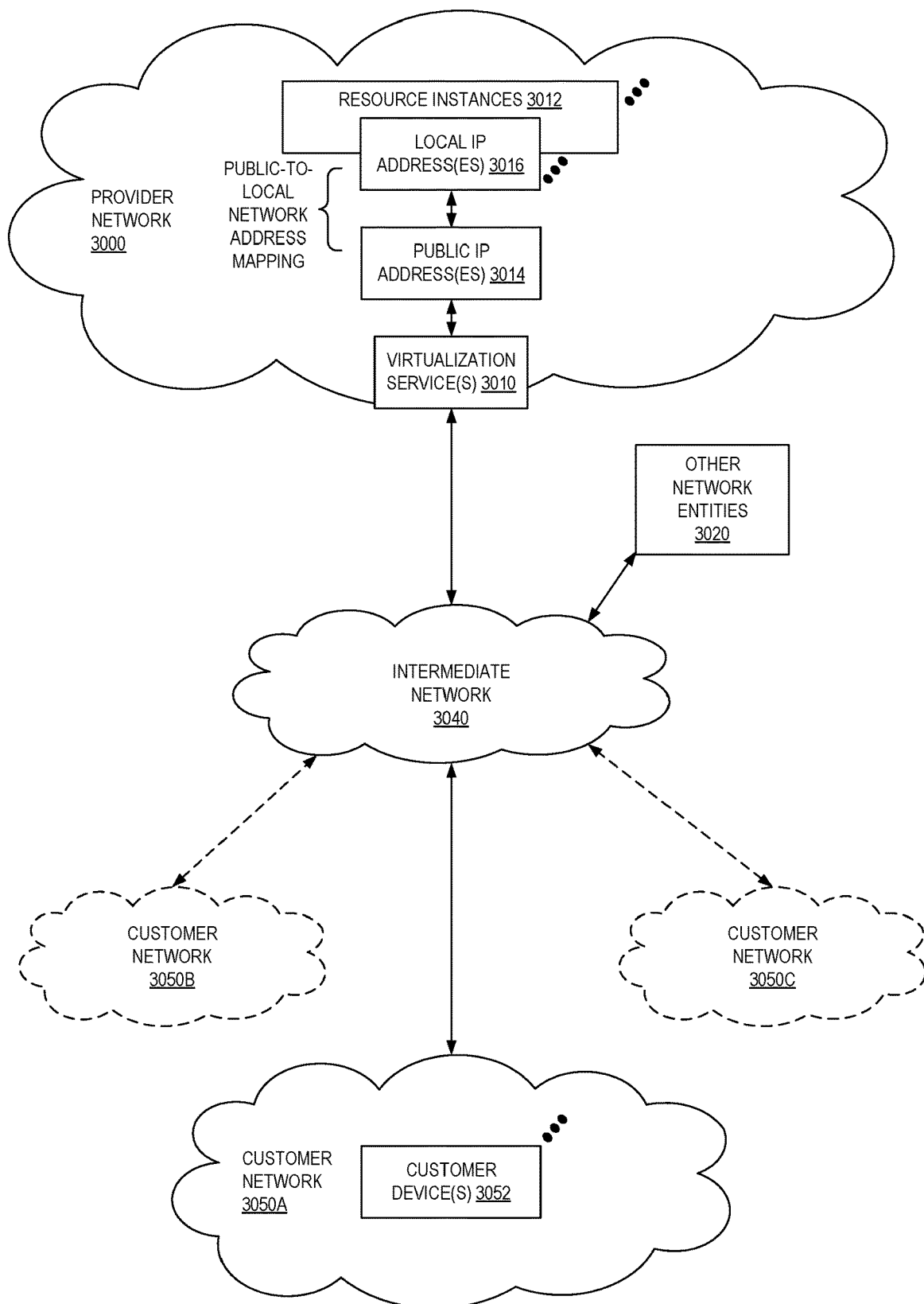
FIG. 30 illustrates an example provider network environment according to some embodiments.

FIG. 30 illustrates an example provider network (or "service provider system") environment according to some embodiments. A provider network 3000 may provide resource virtualization to customers via one or more virtualization services 3010 that allow customers to purchase, rent, or otherwise obtain instances 3012 of virtualized resources, including but not limited to computation and storage resources, implemented on devices within the provider network or networks in one or more data centers. Local Internet Protocol (IP) addresses 3016 may be associated with the resource instances 3012; the local IP addresses are the internal network addresses of the resource instances 3012 on the provider network 3000. In some embodiments, the provider network 3000 may also provide public IP addresses 3014 and/or public IP address ranges (e.g., Internet Protocol version 4 (IPv4) or Internet Protocol version 6 (IPv6) addresses) that customers may obtain from the provider 3000.

Conventionally, the provider network 3000, via the virtualization services 3010, may allow a customer of the service provider (e.g., a customer that operates one or more client networks 3050A-3050C including one or more customer device(s) 3052) to dynamically associate at least some public IP addresses 3014 assigned or allocated to the customer with particular resource instances 3012 assigned to the customer. The provider network 3000 may also allow the customer to remap a public IP address 3014, previously mapped to one virtualized computing resource instance 3012 allocated to the customer, to another virtualized computing resource instance 3012 that is also allocated to the customer. Using the virtualized computing resource instances 3012 and public IP addresses 3014 provided by the service provider, a customer of the service provider such as the operator of customer network(s) 3050A-3050C may, for example, implement customer-specific applications and present the customer's applications on an intermediate network 3040, such as the Internet. Other network entities 3020 on the intermediate network 3040 may then generate traffic to a destination public IP address 3014 published by the customer network(s) 3050A-3050C; the traffic is routed to the service provider data center, and at the data center is routed, via a network substrate, to the local IP address 3016 of the virtualized computing resource instance 3012 currently mapped to the destination public IP address 3014. Similarly, response traffic from the virtualized computing resource instance 3012 may be routed via the network substrate back onto the intermediate network 3040 to the source entity 3020.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 3000; a customer may then assign their allocated public IP addresses to particular resource instances allocated to the customer. These public IP addresses may be referred to as customer public IP addresses, or simply customer IP addresses. Instead of being assigned by the provider network 3000 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 31:
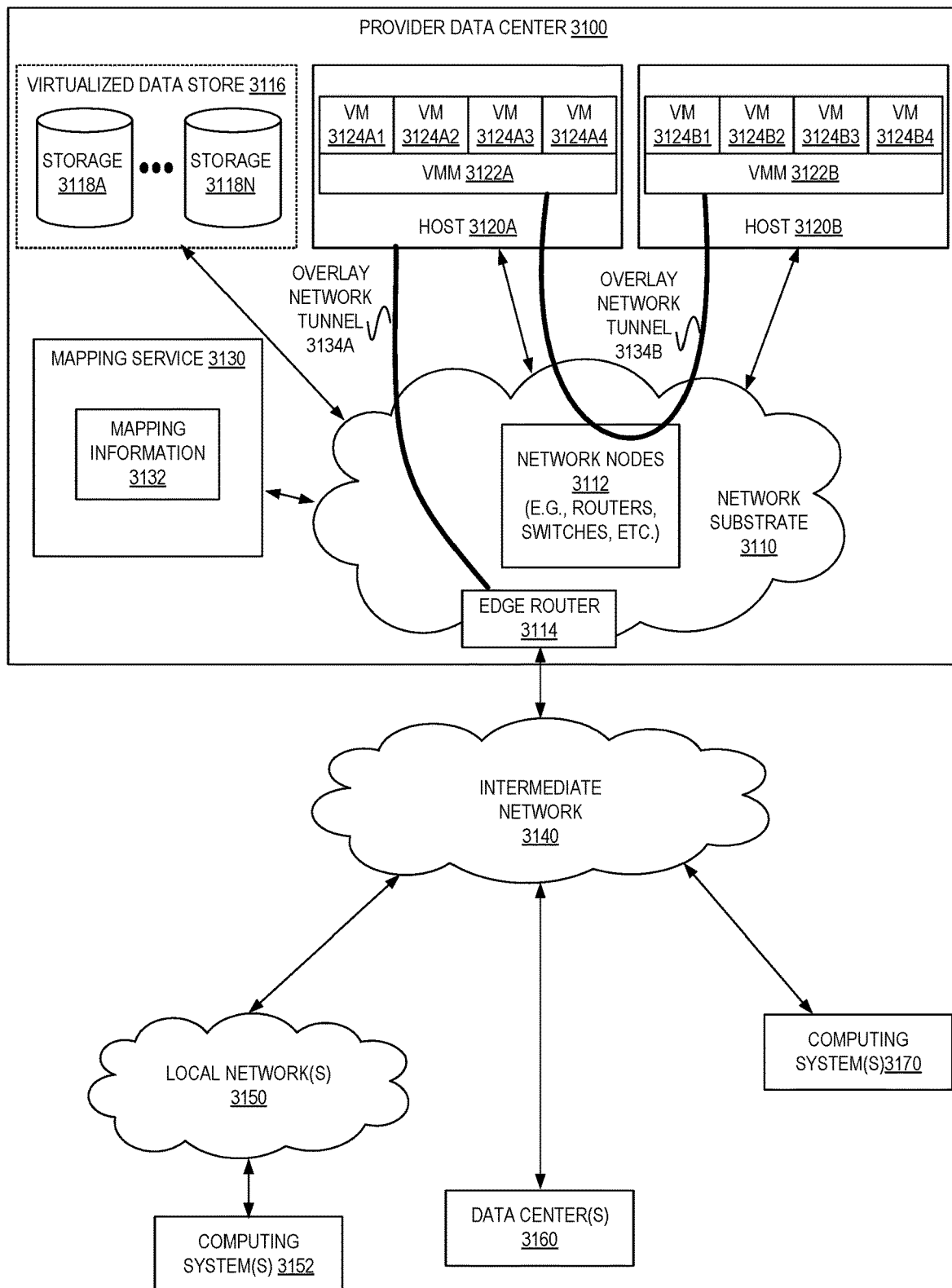
FIG. 31 illustrates an example data center that implements an overlay network on a network substrate using IP tunneling technology according to some embodiments.

FIG. 31 illustrates an example data center that implements an overlay network on a network substrate using IP tunneling technology, according to some embodiments. A provider data center 3100 may include a network substrate that includes networking nodes 3112 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 3110 using tunnels. The IP tunneling technology may provide a mapping and encapsulating system for creating an overlay network on a network (e.g., a local network in data center 3100 of FIG. 31) and may provide a separate namespace for the overlay layer (the public IP addresses) and the network substrate 3110 layer (the local IP addresses). Packets in the overlay layer may be checked against a mapping directory (e.g., provided by mapping service 3130) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 3130) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 31, an example overlay network tunnel 3134A from a virtual machine (VM) 3124A (of VMs 3124A1-3124A4, via VMM 3122A) on host 3120A to a device on the intermediate network 3150 and an example overlay network tunnel 3134B between a VM 3124A (of VMs 3124A-3124A4, via VMM 3122A) on host 3120A and a VM 3124B (of VMs 3124B1-3124B4, via VMM 3122B) on host 3120B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 31, at least some networks in which embodiments may be implemented may include hardware virtualization technology that enables multiple operating systems to run concurrently on a host computer (e.g., hosts 3120A and 3120B of FIG. 31), i.e. as virtual machines (VMs) 3124 on the hosts 3120. The VMs 3124 may, for example, be executed in slots on the hosts 3120 that are rented or leased to customers of a network provider. A hypervisor, or virtual machine monitor (VMM) 3122, on a host 3120 presents the VMs 3124 on the host with a virtual platform and monitors the execution of the VMs 3124. Each VM 3124 may be provided with one or more local IP addresses; the VMM 3122 on a host 3120 may be aware of the local IP addresses of the VMs 3124 on the host. A mapping service 3130 may be aware of (e.g., via stored mapping information 3132) network IP prefixes and IP addresses of routers or other devices serving IP addresses on the local network. This includes the IP addresses of the VMMs 3122 serving multiple VMs 3124. The mapping service 3130 may be centralized, for example on a server system, or alternatively may be distributed among two or more server systems or other devices on the network. A network may, for example, use the mapping service technology and IP tunneling technology to, for example, route data packets between VMs 3124 on different hosts 3120 within the data center 3100 network; note that an interior gateway protocol (IGP) may be used to exchange routing information within such a local network.

In addition, a network such as the provider data center 3100 network (which is sometimes referred to as an autonomous system (AS)) may use the mapping service technology, IP tunneling technology, and routing service technology to route packets from the VMs 3124 to Internet destinations, and from Internet sources to the VMs 3124. Note that an external gateway protocol (EGP) or border gateway protocol (BGP) is typically used for Internet routing between sources and destinations on the Internet. FIG. 31 shows an example provider data center 3100 implementing a network that provides resource virtualization technology and that provides full Internet access via edge router(s) 3114 that connect to Internet transit providers, according to some embodiments. The provider data center 3100 may, for example, provide customers the ability to implement virtual computing systems (VMs) 3124) via a hardware virtualization service and the ability to implement virtualized data stores 3116 on storage resources 3118A-3118N via a storage service.

The data center 3100 network may implement IP tunneling technology, mapping service technology, and a routing service technology to route traffic to and from virtualized resources, for example to route packets from the VMs 3124 on hosts 3120 in data center 3100 to Internet destinations, and from Internet sources to the VMs 3124. Internet sources and destinations may, for example, include computing systems 3170 connected to the intermediate network 3140 and computing systems 3152 connected to local networks 3150 that connect to the intermediate network 3140 (e.g., via edge router(s) 3114 that connect the network 3150 to Internet transit providers). The provider data center 3100 network may also route packets between resources in data center 3100, for example from a VM 3124 on a host 3120 in data center 3100 to other VMs 3124 on the same host or on other hosts 3120 in data center 3100.

A service provider that provides data center 3100 may also provide additional data center(s) 3160 that include hardware virtualization technology similar to data center 3100 and that may also be connected to intermediate network 3140. Packets may be forwarded from data center 3100 to other data centers 3160, for example from a VM 3124 on a host 3120 in data center 3100 to another VM on another host in another, similar data center 3160, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 3118A-3118N, as virtualized resources to customers of a network provider in a similar manner.

Figure 32:
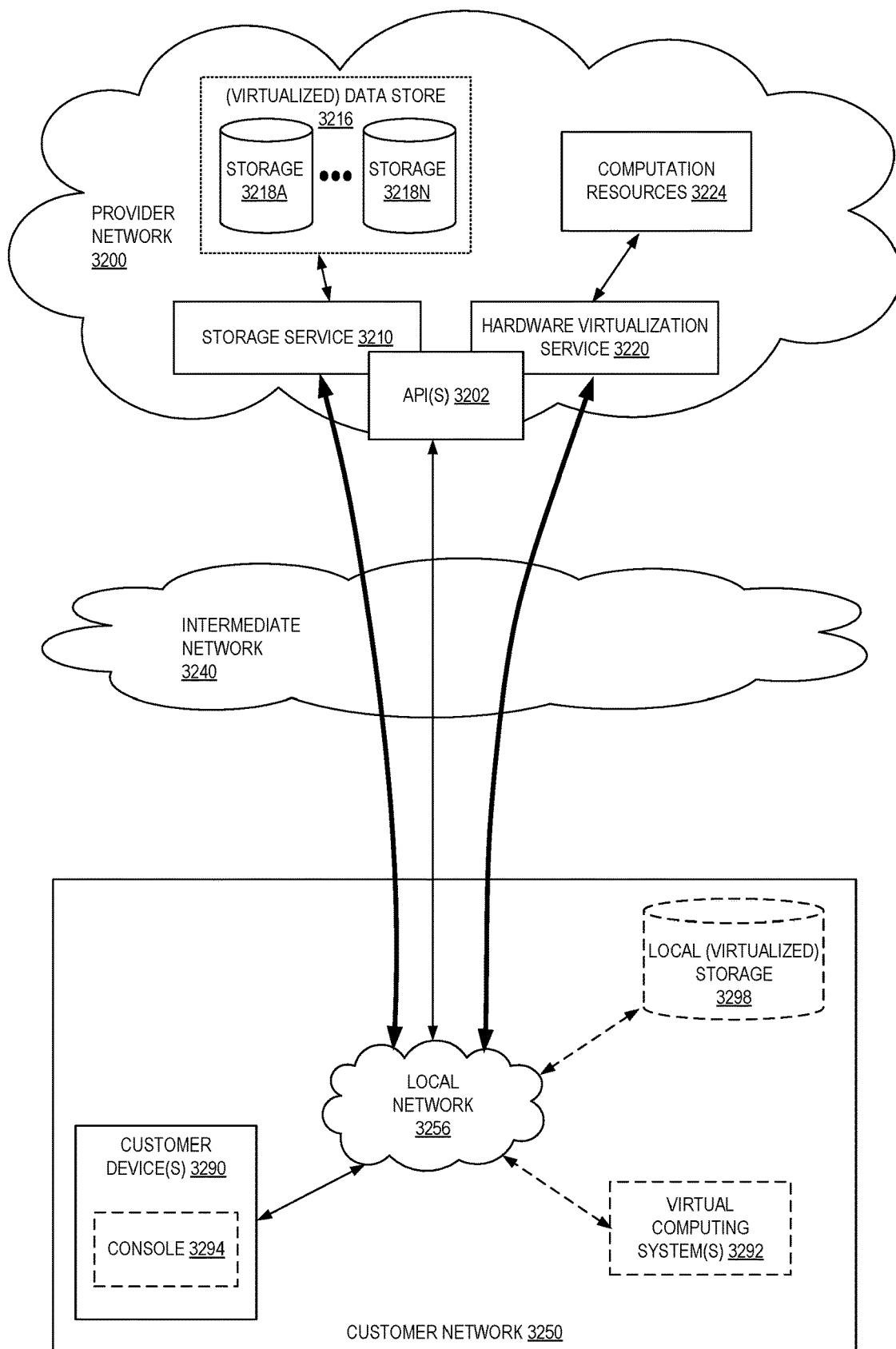
FIG. 32 is a block diagram of an example provider network that provides a storage service and a hardware virtualization service to customers according to some embodiments.

FIG. 32 is a block diagram of an example provider network that provides a storage service and a hardware virtualization service to customers, according to some embodiments. Hardware virtualization service 3220 provides multiple computation resources 3224 (e.g., VMs) to customers. The computation resources 3224 may, for example, be rented or leased to customers of the provider network 3200 (e.g., to a customer that implements customer network 3250). Each computation resource 3224 may be provided with one or more local IP addresses. Provider network 3200 may be configured to route packets from the local IP addresses of the computation resources 3224 to public Internet destinations, and from public Internet sources to the local IP addresses of computation resources 3224.

Provider network 3200 may provide a customer network 3250, for example coupled to intermediate network 3240 via local network 3256, the ability to implement virtual computing systems 3292 via hardware virtualization service 3220 coupled to intermediate network 3240 and to provider network 3200. In some embodiments, hardware virtualization service 3220 may provide one or more APIs 3202, for example a web services interface, via which a customer network 3250 may access functionality provided by the hardware virtualization service 3220, for example via a console 3294 (e.g., a web-based application, standalone application, mobile application, etc.). In some embodiments, at the provider network 3200, each virtual computing system 3292 at customer network 3250 may correspond to a computation resource 3224 that is leased, rented, or otherwise provided to customer network 3250.

From an instance of a virtual computing system 3292 and/or another customer device 3290 (e.g., via console 3294), the customer may access the functionality of storage service 3210, for example via one or more APIs 3202, to access data from and store data to storage resources 3218A-3218N of a virtual data store 3216 (e.g., a folder or "bucket", a virtualized volume, a database, etc.) provided by the provider network 3200. In some embodiments, a virtualized data store gateway (not shown) may be provided at the customer network 3250 that may locally cache at least some data, for example frequently-accessed or critical data, and that may communicate with storage service 3210 via one or more communications channels to upload new or modified data from a local cache so that the primary store of data (virtualized data store 3216) is maintained. In some embodiments, a user, via a virtual computing system 3292 and/or on another customer device 3290, may mount and access virtual data store 3216 volumes via storage service 3210 acting as a storage virtualization service, and these volumes may appear to the user as local (virtualized) storage 3298.

While not shown in FIG. 32, the virtualization service(s) may also be accessed from resource instances within the provider network 3200 via API(s) 3202. For example, a customer, appliance service provider, or other entity may access a virtualization service from within a respective virtual network on the provider network 3200 via an API 3202 to request allocation of one or more resource instances within the virtual network or within another virtual network.

Figure 33:
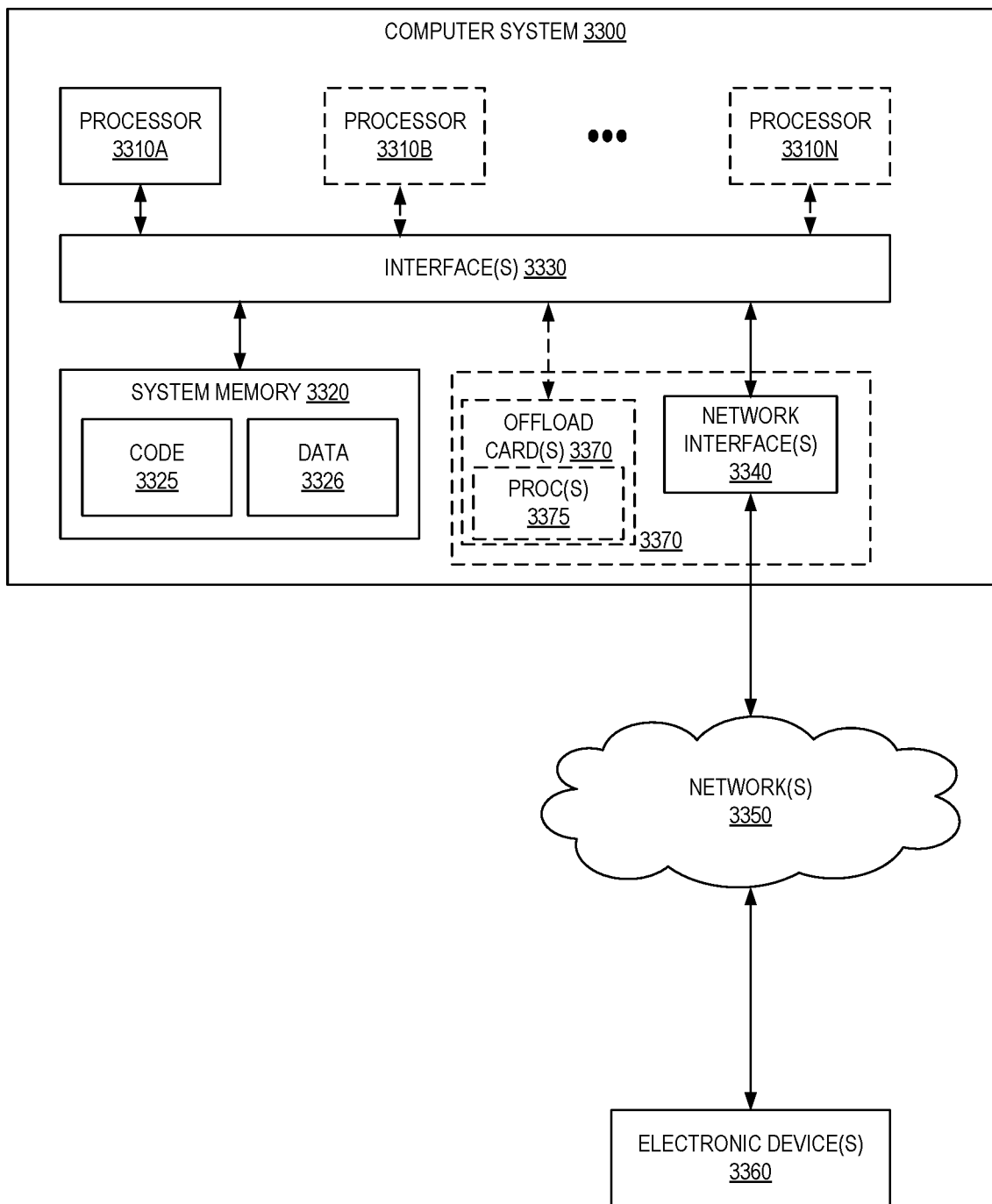
FIG. 33 is a block diagram illustrating an example computer system that may be used in some embodiments.

In some embodiments, a system that implements a portion or all of the techniques as described herein may include a general-purpose computer system that includes or is configured to access one or more computer-accessible media, such as computer system 3300 illustrated in FIG. 33. In the illustrated embodiment, computer system 3300 includes one or more processors 3310 coupled to a system memory 3320 via an input/output (I/O) interface 3330. Computer system 3300 further includes a network interface 3340 coupled to I/O interface 3330. While FIG. 33 shows computer system 3300 as a single computing device, in various embodiments a computer system 3300 may include one computing device or any number of computing devices configured to work together as a single computer system 3300.

In various embodiments, computer system 3300 may be a uniprocessor system including one processor 3310, or a multiprocessor system including several processors 3310 (e.g., two, four, eight, or another suitable number). Processors 3310 may be any suitable processors capable of executing instructions. For example, in various embodiments, processors 3310 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 3310 may commonly, but not necessarily, implement the same ISA.

System memory 3320 may store instructions and data accessible by processor(s) 3310. In various embodiments, system memory 3320 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 3320 as code 3325 and data 3326.

In one embodiment, I/O interface 3330 may be configured to coordinate I/O traffic between processor 3310, system memory 3320, and any peripheral devices in the device, including network interface 3340 or other peripheral interfaces. In some embodiments, I/O interface 3330 may perform any necessary protocol, timing or other data transformations to convert data signals from one component (e.g., system memory 3320) into a format suitable for use by another component (e.g., processor 3310). In some embodiments, I/O interface 3330 may include support for devices attached through various types of peripheral buses, such as a variant of the Peripheral Component Interconnect (PCI) bus standard or the Universal Serial Bus (USB) standard, for example. In some embodiments, the function of I/O interface 3330 may be split into two or more separate components, such as a north bridge and a south bridge, for example. Also, in some embodiments some or all of the functionality of I/O interface 3330, such as an interface to system memory 3320, may be incorporated directly into processor 3310.

Network interface 3340 may be configured to allow data to be exchanged between computer system 3300 and other devices 3360 attached to a network or networks 3350, such as other computer systems or devices as illustrated in FIG. 1, for example. In various embodiments, network interface 3340 may support communication via any suitable wired or wireless general data networks, such as types of Ethernet network, for example. Additionally, network interface 3340 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 3300 includes one or more offload cards 3370 (including one or more processors 3375, and possibly including the one or more network interfaces 3340) that are connected using an I/O interface 3330 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 3300 may act as a host electronic device (e.g., operating as part of a hardware virtualization service) that hosts compute instances, and the one or more offload cards 3370 execute a virtualization manager that can manage compute instances that execute on the host electronic device. As an example, in some embodiments the offload card(s) 3370 can perform compute instance management operations such as pausing and/or un-pausing compute instances, launching and/or terminating compute instances, performing memory transfer/copying operations, etc. These management operations may, in some embodiments, be performed by the offload card(s) 3370 in coordination with a hypervisor (e.g., upon a request from a hypervisor) that is executed by the other processors 3310A-3310N of the computer system 3300. However, in some embodiments the virtualization manager implemented by the offload card(s) 3370 can accommodate requests from other entities (e.g., from compute instances themselves), and may not coordinate with (or service) any separate hypervisor.

In some embodiments, system memory 3320 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 3300 via I/O interface 3330. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 3300 as system memory 3320 or another type of memory. Further, a computer-accessible medium may include transmission media or signals such as electrical, electromagnetic, or digital signals, conveyed via a communication medium such as a network and/or a wireless link, such as may be implemented via network interface 3340.

Figure 34:
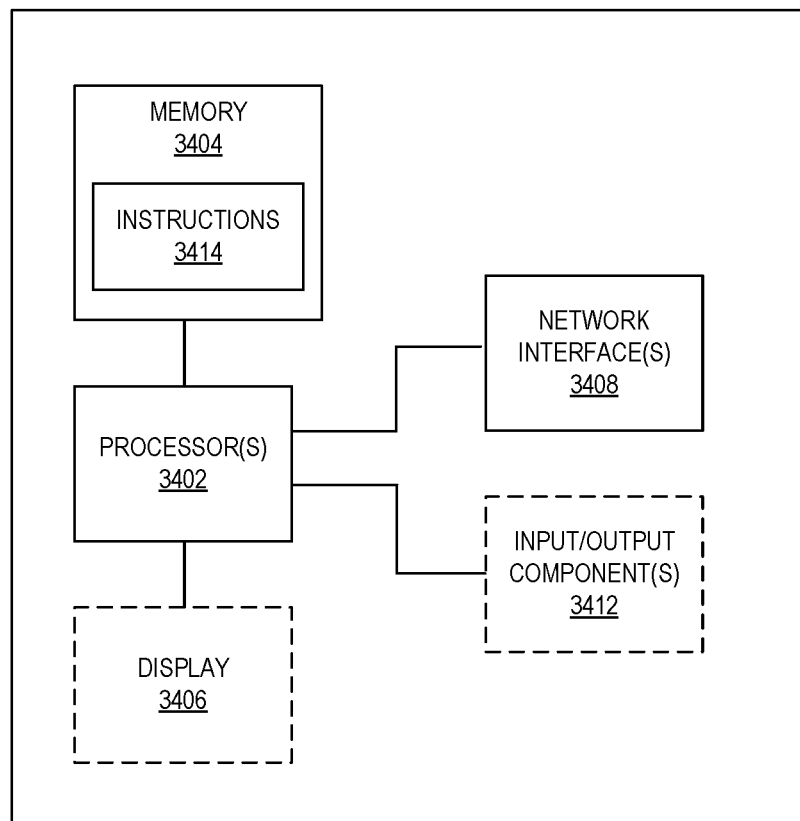
FIG. 34 illustrates a logical arrangement of a set of general components of an exemplary computing device that can be utilized in accordance with various embodiments.

FIG. 34 illustrates a logical arrangement of a set of general components of an example computing device 3400 such as those detailed above. Generally, a computing device 3400 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 3402 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 3404) to store code (e.g., instructions 3414) and/or data, and a set of one or more wired or wireless network interfaces 3408 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 3404) of a given electronic device typically stores code (e.g., instructions 3414) for execution on the set of one or more processors 3402 of that electronic device. One or more parts of various embodiments may be implemented using different combinations of software, firmware, and/or hardware.

A computing device 3400 can include some type of display element 3406, such as a touch screen or liquid crystal display (LCD), although many devices such as portable media players might convey information via other means, such as through audio speakers, and other types of devices such as server end stations may not have a display element 3406 at all. As discussed, some computing devices used in some embodiments include at least one input and/or output component(s) 3412 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 35:
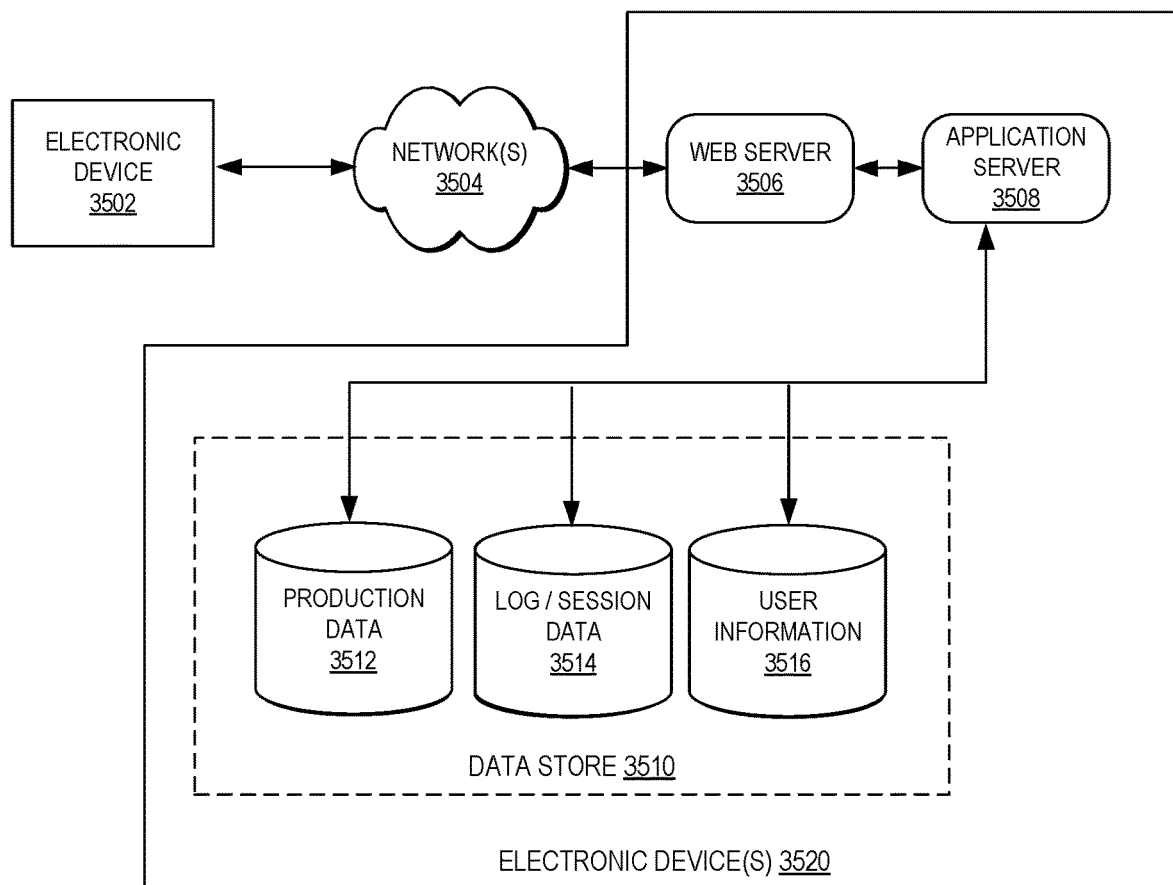
FIG. 35 illustrates an example of an environment for implementing aspects in accordance with various embodiments.

As discussed, different approaches can be implemented in various environments in accordance with the described embodiments. For example, FIG. 35 illustrates an example of an environment 3500 for implementing aspects in accordance with various embodiments. For example, in some embodiments requests are HyperText Transfer Protocol (HTTP) requests that are received by a web server (e.g., web server 3506), and the users, via electronic devices, may interact with the provider network via a web portal provided via the web server 3506 and application server 3508. As will be appreciated, although a web-based environment is used for purposes of explanation, different environments may be used, as appropriate, to implement various embodiments. The system includes an electronic client device 3502, which may also be referred to as a client device and can be any appropriate device operable to send and receive requests, messages or information over an appropriate network 3504 and convey information back to a user of the device 3502. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 3504 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 3504 includes the Internet, as the environment includes a web server 3506 for receiving requests and serving content in response thereto, although for other networks an alternative device serving a similar purpose could be used, as would be apparent to one of ordinary skill in the art.

The illustrative environment includes at least one application server 3508 and a data store 3510. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 3508 can include any appropriate hardware and software for integrating with the data store 3510 as needed to execute aspects of one or more applications for the client device 3502 and handling a majority of the data access and business logic for an application. The application server 3508 provides access control services in cooperation with the data store 3510 and is able to generate content such as text, graphics, audio, video, etc., to be transferred to the client device 3502, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 3502 and the application server 3508, can be handled by the web server 3506. It should be understood that the web server 3506 and application server 3508 are not required and are merely example components, as structured code discussed herein can be executed on any appropriate device or host machine as discussed elsewhere herein.

The data store 3510 can include several separate data tables, databases, or other data storage mechanisms and media for storing data relating to a particular aspect. For example, the data store illustrated includes mechanisms for storing production data 3512 and user information 3516, which can be used to serve content for the production side. The data store 3510 also is shown to include a mechanism for storing log or session data 3514. It should be understood that there can be many other aspects that may need to be stored in the data store, such as page image information and access rights information, which can be stored in any of the above listed mechanisms as appropriate or in additional mechanisms in the data store 3510. The data store 3510 is operable, through logic associated therewith, to receive instructions from the application server 3508 and obtain, update, or otherwise process data in response thereto. In one example, a user might submit a search request for a certain type of item. In this case, the data store 3510 might access the user information 3516 to verify the identity of the user and can access a production data 3512 to obtain information about items of that type. The information can then be returned to the user, such as in a listing of results on a web page that the user is able to view via a browser on the user device 3502. Information for a particular item of interest can be viewed in a dedicated page or window of the browser.

The web server 3506, application server 3508, and/or data store 3510 may be implemented by one or more electronic devices 3520, which can also be referred to as electronic server devices or server end stations, and may or may not be located in different geographic locations. Each of the one or more electronic devices 3520 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 35. Thus, the depiction of the environment 3500 in FIG. 35 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 3218A-3218N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to build a custom slot type, the request including an indication of one or more locations storing information needed to build a custom slot type, a slot type being a list of one or more values used to train a machine learning model to recognize a value for a slot;
   retrieving a build manifest associated with the request to build a custom slot type from an identified storage location of the request, the build manifest detailing files to be used to generate the custom slot type including a slot type definition bundle, a location of those files, and an indication of where to store any generated artifacts;
   retrieving the slot type definition bundle associated with the request, the slot type definition bundle at least including a slot type definition defining resolution activities for the custom slot type and a grammar to define behavior for the custom slot type;
   building the custom slot type using the retrieved slot type definition bundle and build manifest by:
      parsing the grammar to determine how to build the slot type, and
      calling a builder to build the slot type; and
   storing slot type artifacts produced from building the custom slot type to be used during an analysis of an utterance.

2. The computer-implemented method of claim 1, wherein the grammar defines one or more of a rule for matching characters within tokens, a property assignment to identify a part of an utterance to be worked on separately, and a slot type reference to other slot types.

3. The computer-implemented method of claim 1, wherein the slot type artifacts include the slot type definition, label-to-resolver mappings, and resolver configurations.

4. A computer-implemented method comprising:
   receiving a request to build a custom slot type, the request including an indication of one or more locations storing information need to build a custom slot type, a slot type being a list of one or more values used to train a machine learning model to recognize a value for a slot;
   retrieving a slot type definition bundle associated with the request, the slot type definition bundle at least including a slot type definition defining resolution activities for the custom slot type;
   building the custom slot type using the retrieved slot type definition bundle by parsing a grammar to determine how to build the slot type, and calling a builder to build the slot type; and
   storing slot type artifacts produced from building the custom slot type to be used during an analysis of an utterance.

5. The computer-implemented method of claim 4, wherein a domain specific language is utilized to write a grammar that defines one or more of a rule for matching tokens, a rule for matching characters within tokens, a property assignment to identify a part of an utterance to be worked on separately, a slot type reference to other slot types, and a resolver.

6. The computer-implemented method of claim 5, wherein a rule references a resolver selected from one of a code hook resolver, a catalog resolver, and a script resolver.

7. The computer-implemented method of claim 5, wherein a rule supports operators of groupings, repeaters, property assignment, and/concatenation, and logical or.

8. The computer-implemented method of claim 7, wherein a script builder is called to build a script based resolver and a finite state transducer builder is called to build a finite state transducer.

9. The computer-implemented method of claim 5, wherein a rule for matching characters within tokens supports operators of groupings, repeaters, and/concatenation, and logical or.

10. The computer-implemented method of claim 4, further comprising:
    building a finite state transducer slot type using the retrieved slot type definition bundle by:
    parsing the grammar to determine how to build the finite state transducer; and
    calling a slot type finite state transducer builder to compile the grammar into a finite state transducer based on the parsing of the grammar.

11. The computer-implemented method of claim 4, wherein building resolver slot type using the retrieved slot type definition bundle comprises:
    parsing the grammar to determine how to build the resolver; and
    calling a slot type resolver builder which calls an appropriate builder to build a resolver of the identified type.

12. The computer-implemented method of claim 4, wherein the slot type artifacts include the slot type definition, label-to-resolver mapping, and resolver configurations.

13. The computer-implemented method of claim 12, wherein the slot type artifacts further include one or more of a finite state transducer, an automatic speech recognition transcription, a resolver, and training data for machine learning models.

14. A system comprising:
    storage for slot type artifacts; and
    a natural language understanding (NLU) service implemented by a second one or more electronic devices, the NLU service including instructions that upon execution are to cause:
    receiving a request to build a custom slot type, the request including an indication of one or more locations storing information need to build a custom slot type including a slot type definition bundle, a slot type being a list of one or more values used to train a machine learning model to recognize a value for a slot;

retrieving the slot type definition bundle associated with the request, the slot type definition bundle at least including a slot type definition defining resolution activities for the custom slot type;

building the custom slot type using the retrieved slot type definition bundle by: parsing the grammar to determine how to build the slot type, and calling a builder to build the slot type; and storing into the storage slot type artifacts produced from building the custom slot type to be used during an analysis of an utterance.

15. The system of claim 14, wherein a domain specific language is utilized to write a grammar that defines one or more of a rule for matching tokens, a rule for matching characters within tokens, a property assignment to identify a part of an utterance to be worked on separately, a slot type reference to other slot types, and a resolver.

16. The system of claim 15, wherein a rule references a resolver selected from one of a finite state transducer resolver, a code hook resolver, a catalog resolver, and a script resolver.

17. The system of claim 15, wherein a rule supports operators of groupings, repeaters, property assignment, and/ concatenation, and logical or.

18. The system of claim 15, wherein a rule for matching characters within tokens supports operators of groupings, repeaters, and/concatenation, and logical or.

19. The system of claim 15, wherein the input slot type artifacts include the slot type definition, label-to-resolver mapping, and resolver configurations.

20. The system of claim 19, wherein the slot type artifacts further include one or more of a finite state transducer, an automatic speech recognition transcription, a resolver, and training data for machine learning models.

* * * * *